US007244066B2

(12) United States Patent
Theuerkorn

(10) Patent No.: US 7,244,066 B2
(45) Date of Patent: Jul. 17, 2007

(54) FIBER OPTIC RECEPTACLE AND PLUG ASSEMBLY INCLUDING ALIGNMENT SLEEVE INSERT

(75) Inventor: Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/231,837

(22) Filed: Sep. 21, 2005

(65) Prior Publication Data
US 2006/0193562 A1  Aug. 31, 2006

Related U.S. Application Data

(63) Continuation-in-part of application No. 11/066,986, filed on Feb. 25, 2005, now Pat. No. 7,137,742.

(51) Int. Cl.
*G02B 6/36* (2006.01)
(52) U.S. Cl. ...................................................... 385/53
(58) Field of Classification Search ................ 385/55, 385/60, 70, 72, 76, 78
See application file for complete search history.

(56) References Cited

U.S. PATENT DOCUMENTS

| 4,140,367 | A | 2/1979 | Makuch et al. | 350/96.21 |
|---|---|---|---|---|
| 4,142,776 | A | 3/1979 | Cherin et al. | 350/96.21 |
| 4,174,882 | A | 11/1979 | McCartney | 350/96.21 |
| 4,225,214 | A | 9/1980 | Hodge et al. | 350/96.21 |
| 4,279,467 | A | 7/1981 | Borsuk et al. | 350/96.21 |
| 4,793,683 | A | 12/1988 | Cannon, Jr. et al. | 350/96.21 |
| 5,042,901 | A | 8/1991 | Merriken et al. | 385/135 |
| 5,104,242 | A | 4/1992 | Ishikawa | 385/53 |
| 5,267,342 | A | 11/1993 | Takahashi et al. | 385/140 |
| 5,283,848 | A | 2/1994 | Abendschein et al. | 385/59 |
| 5,715,342 | A | 2/1998 | Nodfelt et al. | 385/61 |
| 5,778,122 | A | 7/1998 | Giebel et al. | 385/55 |
| 5,892,870 | A | 4/1999 | Fingler et al. | 385/59 |

(Continued)

FOREIGN PATENT DOCUMENTS

| EP | 0156075 A2 | 12/1984 |
|---|---|---|
| EP | 0689069 A1 | 6/1995 |

OTHER PUBLICATIONS

Fiber Systems International Fiber Optic Solutions Spec Sheet, TFOCA-II® 4-Channel Fiber Optic Connector, 2 sheets, 2003.

*Primary Examiner*—Sarah Song
(74) *Attorney, Agent, or Firm*—Jeffrey S. Bernard

(57) ABSTRACT

A fiber optic receptacle and plug assembly includes a fiber optic receptacle adapted to be mounted within a connector port of a network connection terminal and a fiber optic plug mounted upon an end of a fiber optic cable, wherein the fiber optic receptacle and the fiber optic plug comprise complimentary alignment and keying features that allow the fiber optic receptacle to receive only a fiber optic plug of like ferrule configuration. The fiber optic receptacle includes an alignment sleeve insert operable for receiving and optically connecting at least one receptacle ferrule and at least one opposing plug ferrule. The receptacle is suitable for use in enclosures requiring a minimal receptacle penetration depth, wherein the fiber optic receptacle comprises a shoulder that is secured against an inner wall of the enclosure to provide strain relief against cable-pulling forces of up to about 600 lbs.

18 Claims, 14 Drawing Sheets

U.S. PATENT DOCUMENTS

| | | | |
|---|---|---|---|
| 5,920,669 A | 7/1999 | Knecht et al. | 385/76 |
| 5,940,559 A | 8/1999 | Noll | 385/53 |
| 6,206,579 B1 | 3/2001 | Selfridge et al. | 385/60 |
| 6,234,683 B1 | 5/2001 | Waldron et al. | 385/78 |
| 6,264,374 B1 | 7/2001 | Selfridge et al. | 385/78 |
| 6,305,849 B1 | 10/2001 | Roehrs et al. | 385/59 |
| 6,357,929 B1 | 3/2002 | Roehrs et al. | 385/59 |
| 6,371,660 B1 | 4/2002 | Roehrs et al. | 385/59 |
| 6,579,014 B2 | 6/2003 | Melton et al. | 385/76 |
| 6,648,520 B2 | 11/2003 | McDonald et al. | 385/78 |
| 6,685,361 B1 | 2/2004 | Rubino et al. | 385/58 |
| 2005/0041928 A1 | 2/2005 | Zimmel et al. | |
| 2005/0117850 A1* | 6/2005 | Milette | 385/55 |

* cited by examiner

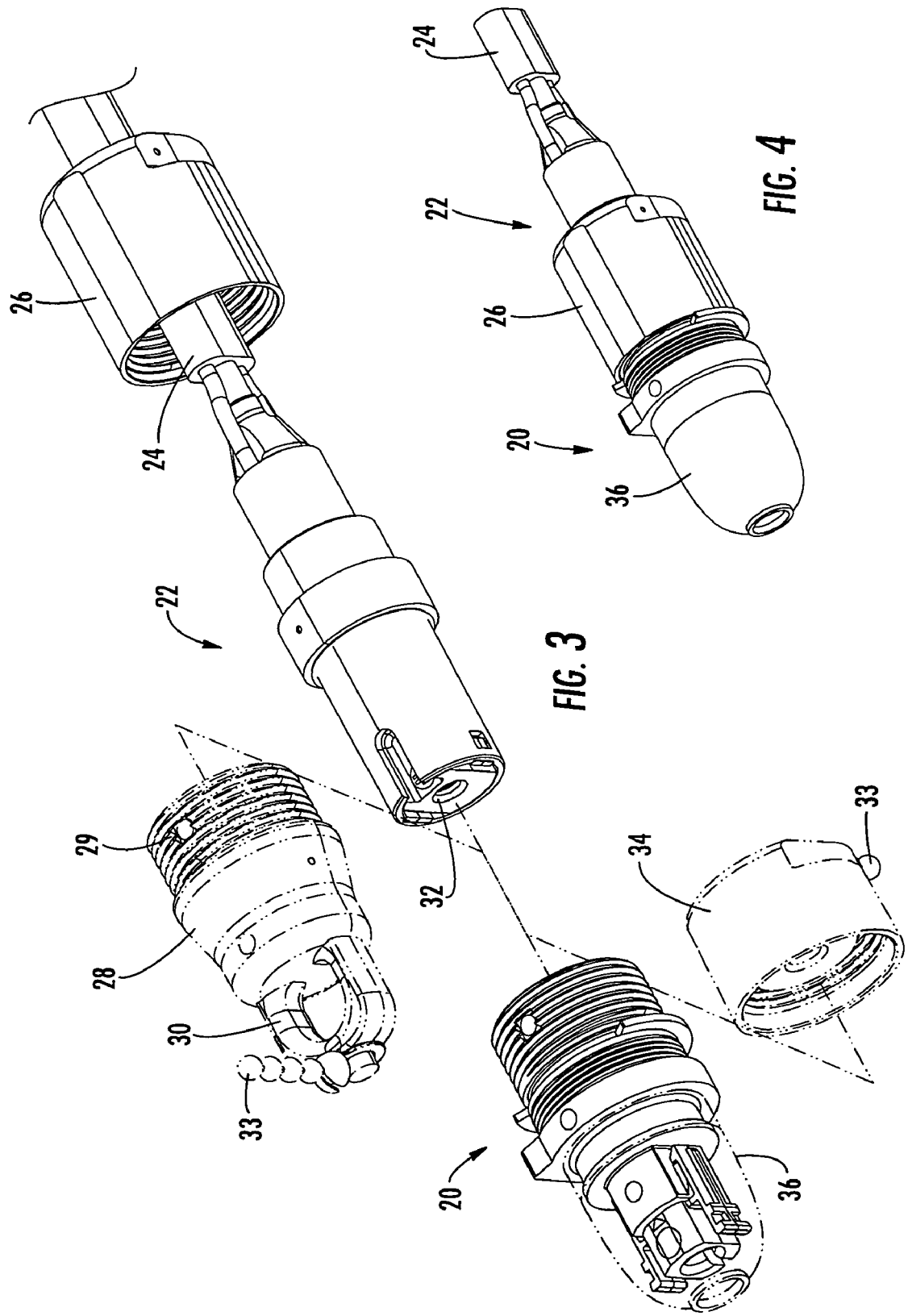

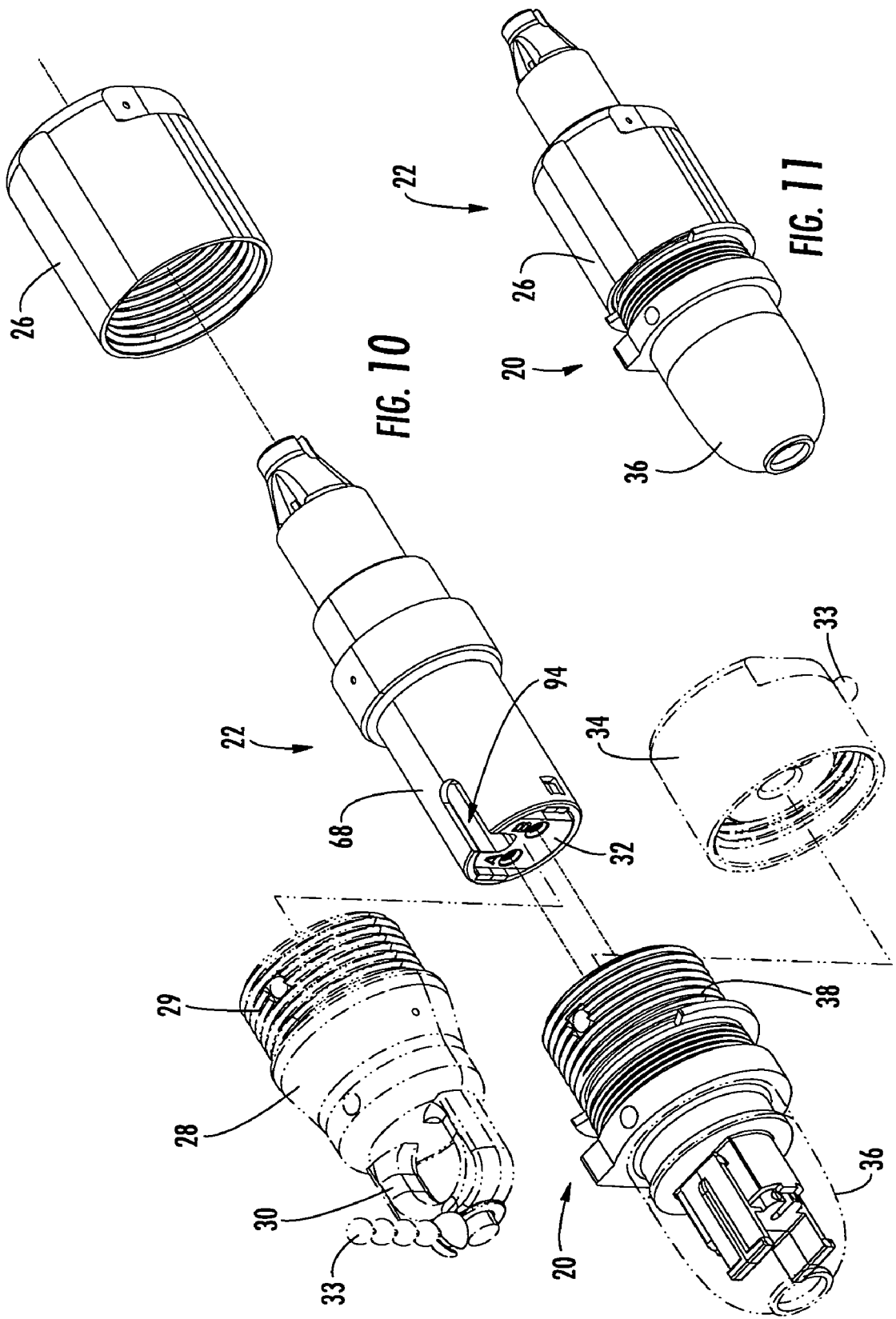

and plug assembly including alignment sleeve insert">

FIBER OPTIC RECEPTACLE AND PLUG ASSEMBLY INCLUDING ALIGNMENT SLEEVE INSERT

CROSS-REFERENCE TO RELATED APPLICATIONS

This application is a continuation-in-part of U.S. application Ser. No. 11/066,986 filed on Feb. 25, 2005, is now a U.S. Pat. No. 7,137,742 and entitled "FIBER OPTIC RECEPTACLE AND PLUG ASSEMBLIES WITH ALIGNMENT AND KEYING FEATURES," the contents of which are hereby incorporated by reference.

BACKGROUND OF THE INVENTION

1. Field of the Invention

The present invention relates generally to assemblies for interconnecting optical fibers, and more specifically, to fiber optic receptacle and plug assemblies including an alignment sleeve insert with alignment and keying features for interconnecting optical fibers within a fiber optic communications network.

2. Technical Background

Optical fiber is increasingly being used for a variety of broadband applications including voice, video and data transmissions. As a result, fiber optic communications networks include a number of interconnection points at which optical fibers are interconnected with other optical fibers. Fiber optic networks also include a number of connection terminals, examples of which include, but are not limited to, network access point (NAP) enclosures, aerial closures, below grade closures, pedestals, optical network terminals (ONTs) and network interface devices (NIDs). In certain instances the connection terminals include connector ports, typically opening through an external wall of the terminal, that are used to establish optical connections between optical fibers terminated from the distribution cable and respective optical fibers of one or more pre-connectorized drop cables, extended distribution cables, tether cables or branch cables, collectively referred to herein as "drop cables." The connection terminals are used to provide communications services to a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx."

Conventional connector ports opening through an external wall of a connection terminal typically include a receptacle for receiving a connectorized optical fiber, such as a pigtail, optically connected within the connection terminal to an optical fiber of the distribution cable, for example in a splice tray or splice protector. At present, these receptacles are relatively large in size because the connection terminal in which they are located does not limit the size of the receptacle. Furthermore, existing receptacles include a two-piece receptacle housing defining an interior cavity that houses a biased alignment sleeve for receiving and aligning the mating ferrules. As previously mentioned, one of the mating ferrules is mounted upon the end of an optical fiber that is optically connected to an optical fiber of the distribution cable within the connection terminal. The other mating ferrule is mounted upon the end of an optical fiber of a drop cable that extends into the receptacle from outside the connection terminal. The alignment sleeve of the receptacle assists in gross alignment of the ferrules, and ferrule guide pins or other alignment means assist in more precise alignment of the opposing end faces of the ferrules.

In particular, a fiber optic plug mounted upon the end of a fiber optic drop cable is received within the receptacle through the external wall of the connection terminal. Typically, the plug includes a generally cylindrical plug body and a fiber optic connector including a plug ferrule disposed within the cylindrical plug body. The end of the cylindrical plug body is open, or is provided with one or more openings covered by a removable cap, so that the ferrule is accessible. The plug ferrule is mounted upon one or more optical fibers of the fiber optic drop cable such that mating the plug with the receptacle aligns the optical fibers of the drop cable with respective optical fibers terminated from the distribution cable within the connection terminal. In the process of mating the plug with the receptacle, the plug ferrule is inserted into one end of the alignment sleeve housed within the receptacle. As a result of the construction of a conventional fiber optic plug, the alignment sleeve is minimally received within the open end of the plug body as the plug ferrule is inserted into the alignment sleeve.

Several different types of conventional fiber optic connectors have been developed, examples of which include, but are not limited to, SC, ST, LC, DC, MTP, MT-RJ and SC-DC connectors. The size and shape of each of these conventional connectors are somewhat different. Correspondingly, the size and shape of the alignment sleeve, the receptacle and the plug are somewhat different. As a result, in conventional practice different fiber optic receptacles and plugs are utilized in conjunction with the different types of fiber optic connectors. In this regard, the fiber optic receptacles generally define different sized internal cavities corresponding to the sizes of the alignment sleeve and, in turn, according to a ferrule of the fiber optic connector to be inserted within the alignment sleeve.

In addition to requiring the use of different fiber optic receptacles and plugs based upon the specific type of optical connector, conventional receptacle and plug assemblies are relatively large in size. More compact and organized assemblies are needed for high-density installations. Current smaller sized assemblies, however, are not able to satisfy the high tensile loads required for FTTx installations, including for example the 600 lbs. drop cable pull test requirement. Exposure to adverse environmental conditions is also a significant concern since current network plans suggest that receptacles may remain unoccupied (without a mated plug) for an extended period of time due to initial service (also referred to as "take rates") being less than total capacity. Based on tensile load requirements and the need for prolonged environmental protection, it would be desirable to provide a fiber optic receptacle and corresponding fiber optic plug suitable for foolproof mounting in a connection terminal or similar enclosure defining an external wall through which optical fibers are interconnected. As yet however, there is an unresolved need for a compact, yet sufficiently robust fiber optic receptacle that is configured to receive only a fiber optic plug having the same type of optical fiber connector. There is a further unresolved need for a fiber optic receptacle adapted to accommodate an alignment sleeve insert with alignment and keying features that correspond to complimentary alignment and keying features provided on a fiber optic plug of like ferrule configuration.

SUMMARY OF THE INVENTION

In one aspect, the present invention provides various embodiments of fiber optic receptacle and plug assemblies adapted to receive like ferrule configurations. Thus, the present invention provides fiber optic receptacle and plug assemblies designed to readily mate any like number of optical fibers via the use of a connector port disposed within a wall of an enclosure. The present invention further provides smaller sized (i.e., low volume) fiber optic receptacles designed to be secured within connector ports or similar structures of an enclosure, while providing strain relief against drop cable-pulling forces of up to about 600 lbs.

In another aspect, the present invention provides a fiber optic receptacle and plug assembly comprising a fiber optic receptacle adapted to be mounted within a connector port of a network connection terminal and a corresponding fiber optic plug mounted upon an end of a fiber optic cable. The fiber optic receptacle and the fiber optic plug comprise complimentary alignment and keying features that allow the fiber optic receptacle to receive only a fiber optic plug of like ferrule configuration. The fiber optic plug engages a corresponding receptacle within a connector port disposed within a wall of a network connection terminal or other enclosure. The alignment and keying features of the fiber optic receptacle and plug assembly allow non-centric positions of at least one ferrule and radial alignment of the ferrule. The fiber optic receptacle defines an interior cavity for receiving and housing an alignment sleeve insert that includes an alignment sleeve holder defining one or more openings for receiving an alignment sleeve. The alignment sleeve insert is relatively shallow, thus minimizing the depth of the receptacle. The receptacle defines a keying and alignment feature within its interior cavity that is received within a keying and alignment slot defined by the alignment sleeve holder. The keying and alignment feature defined by the receptacle also corresponds to a plug insert of a corresponding fiber optic plug. The receptacle further comprises a shoulder that is secured against a wall of the connection terminal in order to provide strain relief. In an alternative embodiment, the alignment sleeve insert is a molded feature of the receptacle.

In yet another embodiment, the present invention provides a fiber optic receptacle and plug assembly comprising a fiber optic receptacle adapted to be mounted within a connector port of a connection terminal. The receptacle comprises a housing defining an interior cavity opening through opposed first and second ends, wherein the interior cavity is operable for receiving an alignment sleeve insert and a corresponding fiber optic plug through the first end. Any of a variety of pre-assembled back ends may be received through the second end of the receptacle housing such that at least one receptacle ferrule is received within the interior cavity and ultimately received within at least one alignment sleeve of the alignment sleeve holder. In one embodiment, the pre-assembled back end may be secured within the receptacle housing by a ferrule retainer disposed proximate the second end. The assembly further comprises a fiber optic plug including an inner housing, an outer housing, a coupling nut, at least one plug ferrule and a plug insert defining a keying slot and a clearance opening to allow the alignment sleeve holder to be received within the fiber optic plug during connection. The receptacle, alignment sleeve holder, plug housing and plug insert each define alignment and keying features based on ferrule configuration, thus providing a fiber optic receptacle and plug assembly that allows the receptacle to receive only a plug of like ferrule configuration and only in a preferred mating orientation. The receptacle and/or plug may further comprise biasing members that operably engage the ferrules to urge the opposing ferrules towards one another during mating.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be illustrative and not limiting.

BRIEF DESCRIPTION OF THE DRAWINGS

FIG. 3 is a perspective view of a single-fiber version of a fiber optic receptacle and plug assembly shown disengaged and with the respective protective dust and pulling caps removed;

FIG. 4 is a perspective view of the fiber optic receptacle and plug assembly of FIG. 3 shown with the receptacle and plug in a mated configuration;

FIG. 10 is a perspective view of a dual-fiber version of a fiber optic receptacle and plug assembly shown disengaged and with the respective protective dust and pulling caps removed;

FIG. 11 is a perspective view of the fiber optic receptacle and plug assembly of FIG. 10 shown with the receptacle and plug in a mated configuration;

DETAILED DESCRIPTION OF THE PREFERRED EMBODIMENTS

Figure 1:
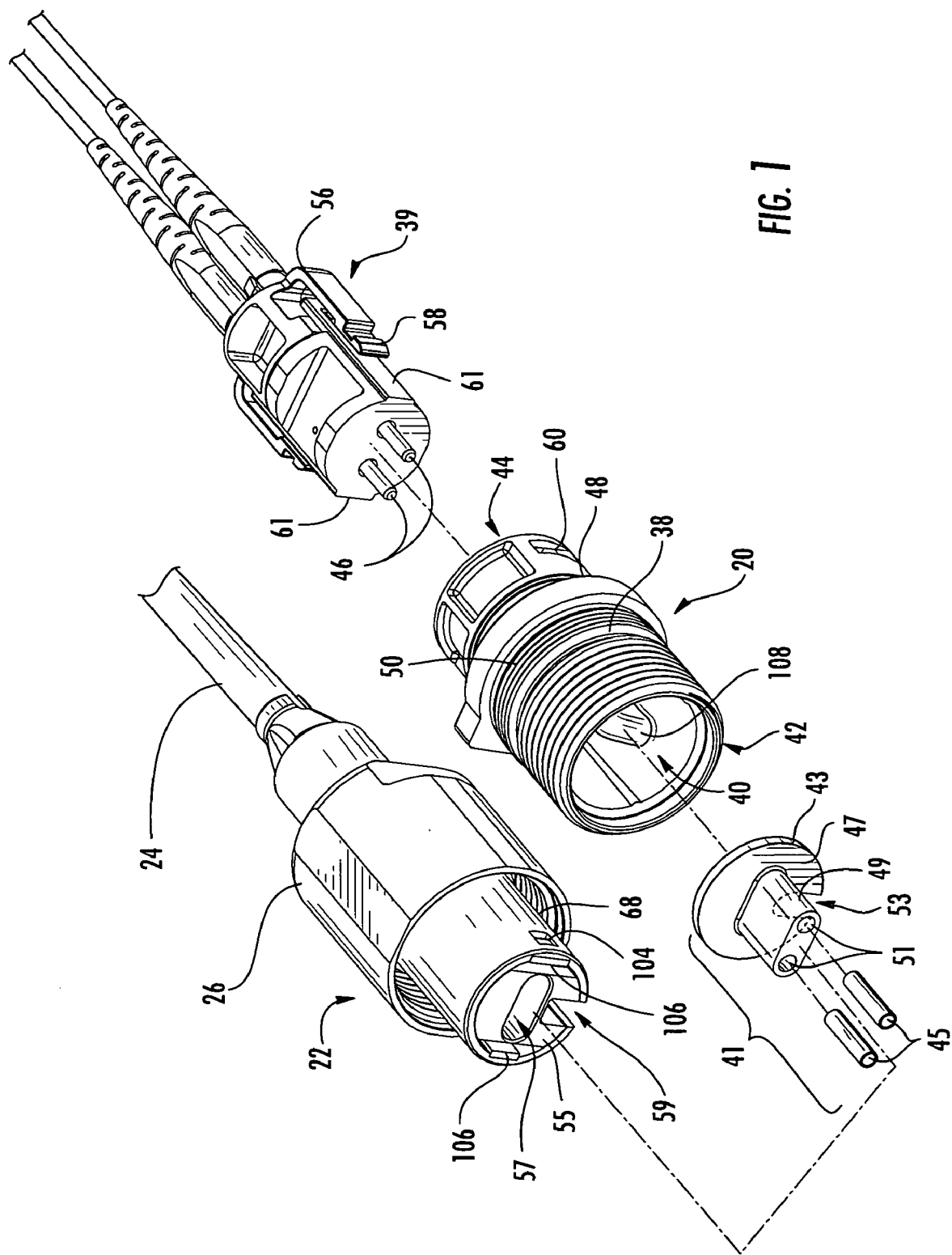
FIG. 1 is a perspective view of a dual-fiber version of a fiber optic receptacle and plug assembly shown disengaged and partially disassembled in order to illustrate the alignment sleeve insert and alignment and keying features.

Reference will now be made in detail to the present preferred embodiments of the invention, examples of which are illustrated in the accompanying drawings. Whenever possible, the same reference numerals will be used throughout the drawings to refer to the same or like parts. Although specific, fiber optic receptacle and plug assemblies for interconnecting optical fibers are shown throughout the figures, it should be understood that the receptacle and plug assemblies described and shown herein may be modified in certain respects, while still including an alignment sleeve insert with alignment and keying features in accordance with the intended scope of the present invention.

In the various embodiments described below, the present invention comprises fiber optic receptacle and plug assemblies for interconnecting optical fibers within an optical communications network. The receptacle portion of each assembly is designed such that it may be mounted in a wall of an enclosure or similar structure defining an external wall through which one or more optical fibers are routed. A rigid shoulder of the fiber optic receptacle is positioned within the enclosure and abuts against the external wall, thus providing superior retention for external pulling forces as compared to conventional assemblies that utilize a threaded nut on the inside of the wall for securing the receptacle. In the exemplary embodiments shown and described herein, the fiber optic plug portion is mounted upon the end of a fiber optic cable comprising one or more optical fibers to be optically connected to corresponding optical fibers routed to the receptacle portion of the assembly. As used herein, the fiber optic cable of the plug is referred to as the "drop cable" and is intended to include all types of fiber optic cables such as, but not limited to a distribution cable, a branch cable, an extended distribution cable, a tether cable, a flat dielectric drop cable, a figure-eight drop cable and an armored drop cable. Furthermore, the particular components of the fiber optic receptacle and plug assemblies described herein may be modified as necessary to accommodate different types of fiber optic cables.

In the exemplary embodiments shown, the drop cable comprises a cable jacket, and a strength component and an optical transmission component disposed within the cable jacket. In one embodiment, the strength component comprises two glass-reinforced plastic (GRP) strength components and the optical transmission component comprises an optical waveguide disposed within a central buffer tube. The drop cable may also comprise strength members that provide additional tensile strength. As used herein, the term "strength component" refers to a strength element having anti-buckling strength, while the term "strength member" refers to a strength element lacking anti-buckling strength. Furthermore, the term "tensile element" refers generically to either a strength component or a strength member. Strength members allow a fiber optic cable to have a smaller cross-sectional footprint due to the fact that they allow the strength components to have smaller diameters since they will not provide all of the tensile strength to the cable. In other words, both the strength components and the strength members carry the tensile load, while only the strength components provide anti-buckling strength. Moreover, by using strength members, the cable remains relatively flexible and is easier to handle. It is understood that other cable types may be used in conjunction with the present invention. Moreover, various optical connectors and/or ferrules may be used with different fiber optic cables according to the concepts of the present invention, thereby resulting in numerous fiber optic cable and connector/ferrule combinations. The drop cable is preferably designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient no known or hereinafter devised for transmitting light signals.

The fiber optic receptacle and plug assemblies of the present invention provide a sealed environment that prevents moisture and contamination from reaching the end faces of the opposing ferrules. In all embodiments, O-rings or flat elastomeric gaskets provide static seals. The position of the seals combined with relief features provided on the receptacle and plug minimize vacuum build-up while uncoupling the plug from the receptacle and pressure build-up while mating the plug with the receptacle. Generally speaking, most of the components of the receptacle and plug assembly are formed from a suitable polymer. Preferably, the polymer is a UV stabilized polymer such as ULTEM 2210 available from GE Plastics. However, other suitable high strength materials, including composite materials and metals may also be used. For example, stainless steel or any other suitable metal may be used for various components to provide an even more robust receptacle and plug assembly.

Figure 2:
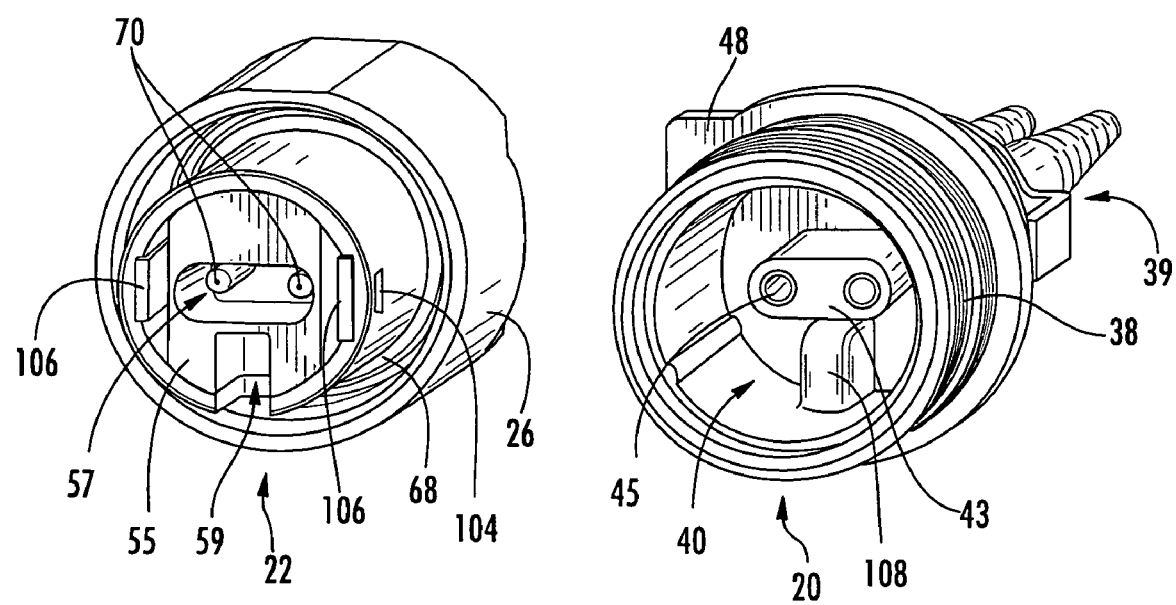
FIG. 2 is a perspective view of the end faces of the receptacle and the corresponding plug of the fiber optic receptacle and plug assembly of FIG. 1 illustrating the alignment and keying features in greater detail.

Referring now to FIGS. 1-2, a fiber optic receptacle and plug assembly according to one embodiment of the present invention is shown. FIG. 1 is a perspective view of a dual-fiber version of a fiber optic receptacle and plug assembly shown disengaged and partially disassembled. FIG. 2 is a perspective view of the end faces of the fiber optic receptacle and corresponding plug of FIG. 1 illustrating alignment and keying features for ensuring that the opposing ferrules are mated in a desired orientation. The assembly includes a fiber optic receptacle 20 and a corresponding fiber optic plug 22. Although not shown for purposes of clarity, the receptacle 20 is typically mounted within an opening, referred to herein as a "connector port," located in a wall of an enclosure, such as a connection terminal in a fiber optic communications network. In a particularly advantageous embodiment, the receptacle 20 is mounted within a connector port located in an external wall of a connection terminal. As such, the receptacle 20 is operable for connecting optical fibers routed to the connector port from outside the connection terminal with optical fibers routed to the connector port from within the connection terminal. It should be understood, however, that the fiber optic receptacle 20 may be mounted to other enclosures and structures, including an internal wall of a re-enterable connection terminal. Each connector port is operable for receiving at least one receptacle 20 having at least one connectorized optical fiber routed to the receptacle from the inside of the connection terminal, and a plug 22 having at least one connectorized optical fiber of a drop cable 24 routed to the receptacle from the outside of the connection terminal. The plug 22 is mounted upon the end portion of the drop cable 24 and is adapted to mate with the corresponding receptacle 20. The plug 22 and the receptacle 20 are further operable for aligning and maintaining the opposing optical fibers in physical contact. A single connector port may interconnect one optical fiber or more than one optical fiber, either by accommodating a multi-fiber ferrule or by accommodating multiple single-fiber ferrules within a receptacle configured to receive a corresponding plug. A single connector port may also be adapted to accommodate more than one receptacle 20 that is likewise configured to receive more than one plug 22.

Still referring to FIGS. 1-2, the receptacle 20 and the corresponding plug 22 are shown disengaged and with the respective protective dust cap and pulling cap removed. To secure the plug 22 and receptacle 20 together, a threaded coupling nut 26 engages the threaded end of the receptacle 20. The coupling nut 26 of the plug 22 is operable for securing the plug 22 to the receptacle 20 upon threaded engagement, and may also be used to secure a protective pulling cap to the plug 22 during installation of the drop cable 24. As with the plug 22 of the assembly, the receptacle 20 may also be covered and sealed with a threaded dust cap that engages the threaded end of the receptacle and is removed immediately prior to inserting the plug 22 into the receptacle 20. At the end of the receptacle 20 opposite the threads, a protective boot (not shown) may be used to protect the receptacle 20, and in some embodiments may also provide sealing. The use of a protective sealing boot allows the assembly to be installed in a breathable or re-enterable enclosure and may become obsolete in the event the receptacle 20 is otherwise reliably sealed from adverse environmental conditions.

The fiber optic receptacle 20 includes a receptacle housing 38 operable for mounting through the wall of the connection terminal. The housing 38 retains a ferrule assembly 39, such as a pre-assembled back-end ferrule assembly, and is at least partly responsible for aligning the ferrule assembly 39 of the receptacle and the ferrule assembly of the corresponding fiber optic plug 22 so that the receptacle and the plug can be engaged in only one desired orientation, as will be described in more detail below. This feature is particularly advantageous for installations including Angled Physical Contact (APC) type ferrules where minimal angular offset is required, as well as installations including multiple single-fiber ferrules. The receptacle housing 38 defines an interior cavity 40 opening through a first end 42 and an opposed second end 44. Typically, the opening through the first end 42 is relatively large so as to receive the corresponding fiber optic plug 22. Conversely, the opening through the second end 44 is typically smaller, and in one advantageous embodiment, is sized to be only slightly larger than the ferrule assembly 39. The relatively large opening of the first end 42 permits cleaning, for example the ferrule end face, with a cotton swab or special cleaning tool. This is advantageous since receptacles, in contrast to fiber optic plugs, may be exposed to adverse environmental conditions while not being used for a prolonged period of time during which the end face of the ferrule may become contaminated with dust dirt, oil, etc. Such an embodiment allows for easy cleaning and improved access without requiring disassembly.

Although the fiber optic receptacle 20 may include a variety of fiber optic connectors including SC, LC, MTRJ, MTP, SC-DC, and the like, the receptacle 20 of the embodiment shown and described herein includes dual SC connectors by way of example, and not of limitation. An alignment sleeve insert 41, including an alignment sleeve holder 43 and alignment sleeves 45, is received within the interior cavity 40 of the receptacle housing 38 through the first end 42. As shown in FIGS. 1-2, the alignment sleeve insert 41 is a component of the receptacle 20. In the alternative exemplary embodiments shown in FIGS. 3-16, the alignment sleeve insert 41 is a component of the plug 22 and is inserted into the interior cavity 40 of the receptacle 20 upon engagement of the plug 22 with the receptacle. The alignment sleeve holder 43 defines a relatively flat, disc-shaped portion 47 for seating against an inner wall of the housing 38, and a protruding portion 49 defining openings 51 for receiving the alignment sleeves 45. The flat portion 47 further defines a slot 53 that operates as a clearance to receive a molded alignment feature and key 108 of the receptacle 20. Thus, only an alignment sleeve holder 43 having a key slot 53 complimentary to the key 108 formed within the housing 38 may be properly inserted into the interior cavity 40.

As described above, the plug 22 engages the receptacle 20 to optically connect the optical fibers routed to the plug 22 and the receptacle 20. The protruding portion 49 of the alignment sleeve holder 43 defines alignment sleeve openings 51 corresponding to the number and type of mating ferrules. In the embodiment shown, two alignment sleeve openings 51 are formed to accept two alignment sleeves 45 used to mate a pair (dual) single-fiber SC ferrules, thus providing a "duplex" optical connector. The alignment sleeve insert 41 is positioned and retained within the interior cavity 40 of the receptacle 20. A plug outer housing 68 retains a plug insert 55 that defines a clearance opening 57 for receiving the protruding portion 49 of the alignment sleeve holder 43. The plug insert 55 defines a further opening 59 that aligns with a feature provided on the plug outer housing 68, both of which define a clearance for receiving the key 108 of the receptacle housing 38 to properly align the plug 22 with the receptacle 20. Thus, the key slot 53 of the alignment sleeve holder 43, the opening 59 of the plug insert 55, and the feature of the plug outer housing 68 are all aligned in such a manner that they collectively pass over the key 108 of the housing 38 upon insertion of the plug 22 into the receptacle 20. The plug outer housing 68 may also define at least one opening 104 along its length for receiving a detent feature 106 defined by the plug insert 55. As shown, detent features 106 and openings 104 may be provided on each side, and may be of a different size and/or shape in order to properly align the plug insert 55 within the plug outer housing 68, and thereby properly align the opening 59 of the plug insert 55 with the outer housing 68.

To form an optical connection, the plug 22 is inserted into the receptacle 20. As previously mentioned, the receptacle 20 may only receive a plug 22 of like ferrule configuration. The receptacle 20 defines the key 108 which may have any desired shape and is preferably molded into the housing 38 of the receptacle 20. Receptacles having specific key shapes may be created for each type and/or number of ferrules. In an alternative embodiment, an insert having a specific key shape may be inserted into the receptacle housing 38 to accommodate a specific plug, thus allowing a generic receptacle housing to be used for different connector types. Upon engagement, the key 108 ensures that the receptacle 20 will accept only a plug 22 having a like ferrule configuration, while also properly aligning the plug 22 within the receptacle 20. Because the alignment and keying features extend to about the end of the plug 22 (i.e., beyond the ferrule), a plug 22 having a ferrule configuration different than the receptacle 20 may not be inserted into the receptacle 20, thereby eliminating potential damage to the ferrules.

The receptacle housing 38 is cylindrically shaped and defines an outwardly depending shoulder portion 48 positioned medially between the first end 42 and the second end 44. During installation through an external wall of a connection terminal, the first end 42 of the receptacle housing 38 is inserted through the wall from the inside of the connection terminal until the radial surface of the shoulder portion 48 facing the first end 42 abuts the inner surface of the wall. By securing the receptacle 20 within the opening through the external wall of the connection terminal using shoulder portion 48, as opposed to a threaded nut for example, the relatively low profile receptacle 20 provides strain relief against cable-pulling forces of up to about 600 lbs. Preferably, a seal is provided between the shoulder portion 48 of receptacle housing 38 and the wall using an O-ring, an elastomeric ring, a multi-point seal 50 (as shown) or like sealing means.

The ferrule assembly 39 includes a ferrule retainer 56 for retaining the ferrule assembly 39 within the receptacle housing 38. The ferrule retainer 56 and the receptacle housing 38 can be connected in various manners, but, in one advantageous embodiment, the ferrule retainer 56 includes hooks 58 that are received by detent features 60 formed on the receptacle housing 38. The ferrule retainer 56 can be removed from the receptacle housing 38 in order to access the ferrules, such as for cleaning, repair, replacement or the like. The design of the ferrule retainer 56 allows for easy removal without a special tool. Once the ferrule assembly 39 has been cleaned, repaired or replaced as necessary, the ferrule retainer 56 can be connected once again to the receptacle housing 38. The hooks 58 may be of differing sizes on each side of the retainer 59 and may be received within different sized features 60 in order to orient the ferrule assembly 39 within the receptacle housing 39 in a desired manner (e.g., polarization). The ferrule retainer 56 may also define different sized ears 61 that are received by different sized detent features 60, such the slots shown herein, within the interior of the receptacle housing 38 adjacent the second end 44.

The ferrule assembly 39 may also include one or more bias members disposed within for operably engaging and urging the ferrules 46 toward the first end 42 of the receptacle housing 38. Typically, the bias members consist of one or more springs. Thus, each receptacle ferrule 46 is spring-loaded and thereby permitted to float axially within the interior cavity 40, thus absorbing compressive forces between the receptacle ferrules 46 and the opposing plug ferrules 70 (FIG. 2).

Referring to FIG. 3, the receptacle 20 and the corresponding plug 22 are shown disengaged and with the respective protective dust cap 34 and pulling cap 28 removed. A threaded coupling nut 26 of the plug 22 operable for securing the plug 22 to the receptacle 20 following engagement may also be used to secure the protective pulling cap 28 on the plug assembly during shipment and deployment prior to installation on the receptacle 20. The pulling cap 28 defines a threaded portion 29 at its rearward end and a pulling loop 30 at its forward end. The pulling cap 28 provides protection of the optical connector 32 of the plug 22 during shipping, deployment and until engagement with the receptacle 20. The pulling cap 28 may be secured to the drop cable 24 using a tether 33 so that the pulling cap 28 may be reused if the plug 22 is disengaged from the receptacle 20 at a later time. In preferred embodiments, the pulling loop 30 should be able to withstand cable-pulling forces up to about 600 lbs. The pulling loop 30 and the pulling cap 28 have a generally rounded forward end to facilitate deployment through conduits and ducts, or over sheave wheels and pulleys. As with the plug 22 of the assembly, the receptacle 20 may also be covered and sealed with a threaded dust cap 34 that is removed prior to inserting the plug 22 within the receptacle 20. The dust cap 34 may also be secured to the receptacle 20 using a like tether 33. At the end of the receptacle 20 opposite the threaded end, a protective boot 36 provides protection for the receptacle 20, and in some embodiments may also provide sealing. The boot 36 allows the assembly to be installed in a breathable enclosure and may become obsolete in the event the receptacle 20 is otherwise reliably sealed from the adverse environment.

Referring to FIG. 4, the fiber optic plug 22 is shown mounted upon the end portion of the fiber optic drop cable 24 and mated with the corresponding fiber optic receptacle 20. To secure the plug 22 and receptacle 20 together, the coupling nut 26 engages the threaded end of the receptacle 20. The manner in which the receptacle 20 and plug 22 assembly is secured within the connector port through the external wall of the connection terminal is described in further detail below in conjunction with other embodiments.

Figure 5:
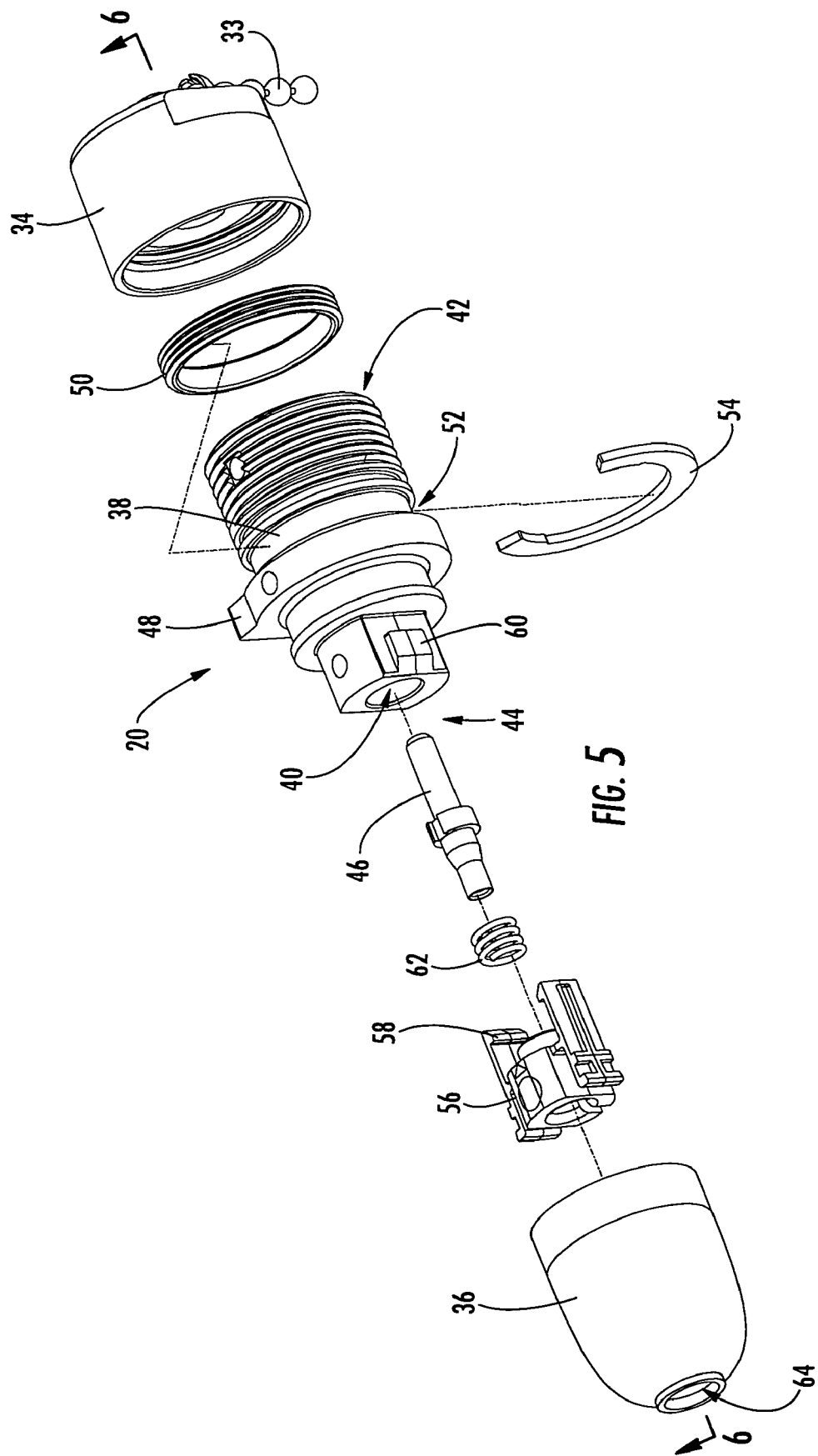
FIG. 5 is an exploded perspective view of the fiber optic receptacle of FIG. 3, including a receptacle body, a single-fiber ferrule, a ferrule retainer, a bias member and sealing members.

Referring to FIG. 5, another embodiment of a fiber optic receptacle 20 includes a receptacle housing 38 operable for mounting to the wall of a connection terminal. The housing 38 holds a ferrule assembly and aligns both the ferrule assembly and the fiber optic plug 22 so that they can engage in only one preferred orientation. This feature is advantageous for installations including Angled Physical Contact (APC) type ferrules where only minimal angular offset is tolerable, as well as multi-fiber ferrules that often are not centric. The receptacle housing 38 defines an interior cavity 40 opening through opposed ends, a first end 42 and a second end 44. Typically, the opening through the first end 42 is relatively large so as to receive the corresponding fiber optic plug 22. Conversely, the opening through the second end 44 is typically smaller and, in one advantageous embodiment, is sized to be only slightly larger than the receptacle ferrule 46, such that the ferrule 46 can be inserted through the opening. The relatively large opening of the first end 42 allows cleaning with a cotton swab or special cleaning tool.

Although the fiber optic receptacle 20 may include a variety of fiber optic connectors including SC, LC, MTRJ, MTP, SC-DC, and the like, the receptacle 20 of the particular embodiment is shown to include a single SC connector by way of example, and not of limitation. Although not included in this particular embodiment, the fiber optic receptacle 20 may include an alignment sleeve disposed within the interior cavity 40 defined by the receptacle housing 38. In the embodiments shown throughout FIGS. 3-16, the alignment sleeve is a component of the plug 22 and is inserted into the interior cavity 40 of the receptacle 20 upon insertion of the plug 22. In this regard, the plug ferrule of the fiber optic plug 22 is inserted into one end of the alignment sleeve, while the receptacle ferrule 46 that is mounted upon the ends of optical fibers routed from within the connection terminal is inserted through the opening defined by the second end 44 of the receptacle 20 and into the opposite end of the alignment sleeve.

As shown, the receptacle housing 38 is cylindrically shaped and defines a shoulder portion 48 positioned medially between the first end 42 and the second end 44. During installation through an external wall of a connection terminal, the first end 42 of the receptacle housing 38 is inserted through the wall from the inside of the connection terminal until the radial surface of the shoulder portion 48 facing the first end 42 abuts the inner surface of the wall. By securing the receptacle 20 within the opening through the external wall of the connection terminal using shoulder portion 48, as opposed to a threaded nut for example, the relatively low profile receptacle 20 provides strain relief against cable-pulling forces of up to about 600 lbs. Preferably, a seal is provided between the shoulder portion 48 of receptacle housing 38 and the wall using an O-ring, an elastomeric ring, a multi-point seal 50 (as shown) or like sealing means. The receptacle housing 38 defines a notch 52 between the shoulder portion 48 and the threaded end for receiving the multi-point seal 50. The notch 52 may further receive a crescent ring 54 for retaining the multi-point seal 50 in place and securing the receptacle 20 within the connector port defined by the opening in the wall of the connection terminal. The coupling nut 26 of the plug 22 is used to further secure the receptacle 20 within the connector port when the plug 22 is mated with the receptacle 20.

The fiber optic receptacle 20 also includes a ferrule retainer 56 for retaining the receptacle ferrule 46 within the interior cavity 40 of the receptacle housing 38. The ferrule retainer 56 and the receptacle housing 38 can be connected in various manners without departing from the intended scope of the preset invention. In one advantageous embodiment, the ferrule retainer 56 includes hooks 58 that are received by detent features 60 protruding outwardly from the receptacle housing 38. The ferrule retainer 56 can be removed from the receptacle housing 38 in order to access the receptacle ferrule 46, such as for cleaning, repair, replacement or the like. The design of the ferrule retainer 56 allows for easy removal without a special tool. Once the receptacle ferrule 46 has been cleaned, repaired or replaced as necessary, the ferrule retainer 56 can be connected once again to the receptacle housing 38.

The fiber optic receptacle 20 of the exemplary embodiment also includes a bias member disposed within the receptacle housing 38. The bias member is positioned between and operably engages the ferrule retainer 56 and the receptacle ferrule 46 to urge the receptacle ferrule 46 toward the first end 42 of the receptacle housing 38. As shown herein, the bias member consists of one or more linear coil springs 62. Thus, the receptacle ferrule 46 is spring-loaded and is allowed to float axially within the interior cavity 40, thus absorbing compressive forces between the receptacle ferrule 46 and the opposing plug ferrule 70. A flexible boot 36 protects the components of the receptacle 20 positioned on the inside of the wall of the connection terminal. The protective boot 36 further defines an opening 64 for receiving optical fibers and/or a fiber optic cable (not shown) from the inside of the connection terminal.

Figure 6:
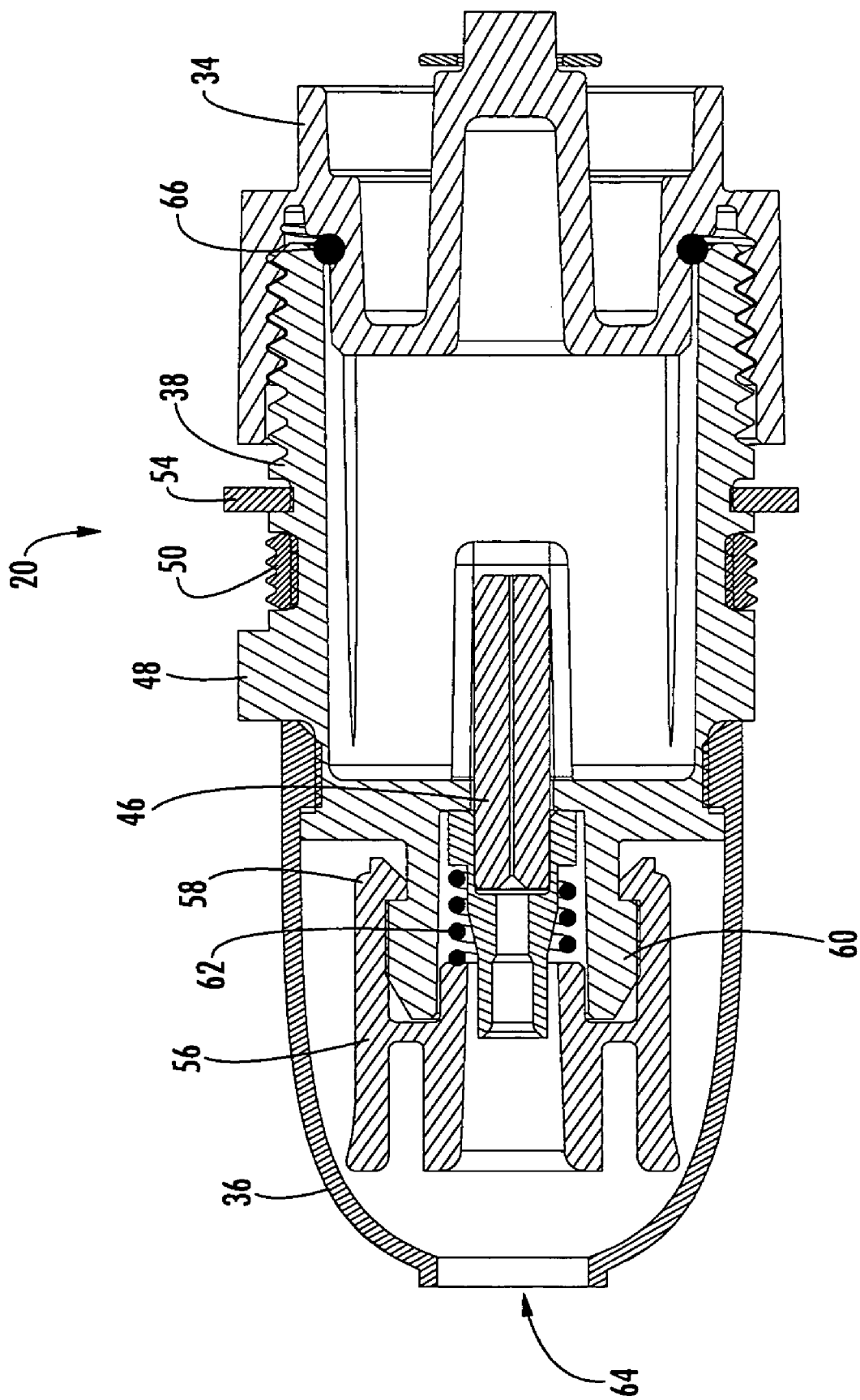
FIG. 6 is a cross-sectional view of the fiber optic receptacle of FIG. 5 taken along the line 6-6 and shown in an assembled configuration.

FIG. 6 is a cross-section of the assembled receptacle assembly 20 of FIG. 5 taken along line 6-6 with like parts indicated by like reference numbers. An O-ring 66 may be used to provide a seal between the dust cap 34 and the receptacle housing 38. As is shown in FIG. 6, the multi-point seal 50 is retained within the groove 52 of the receptacle housing 38 and provides sealing points between the receptacle housing 38 and the wall of the connection terminal. The wall is positioned between the shoulder portion 48 of the receptacle housing 38 and the crescent ring 54. In one embodiment, the crescent ring 54 secures the receptacle 20 in place. In an alternative embodiment, the dust cap 34 or the coupling nut 26 of the fiber optic plug 22 is used to secure the receptacle 20 in place.

Figure 7:
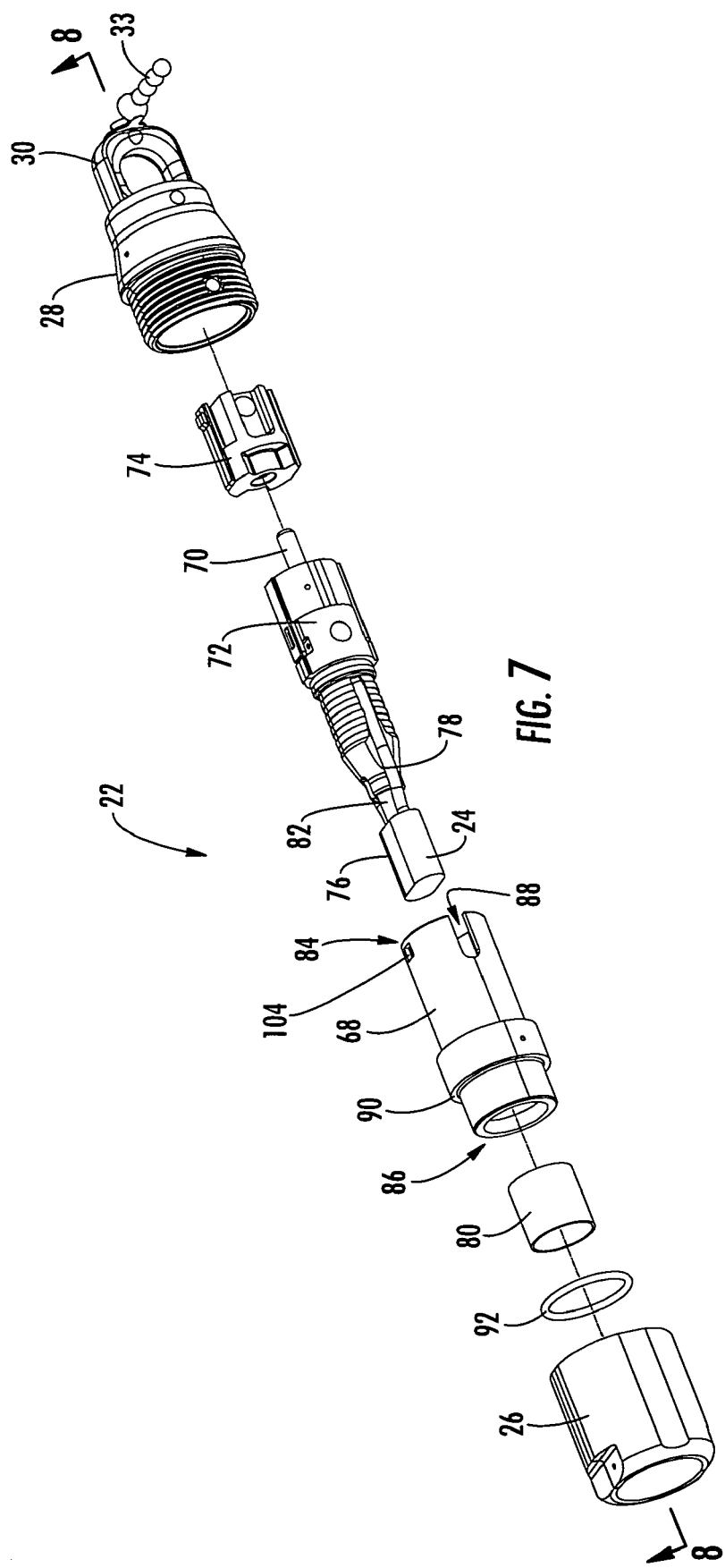
FIG. 7 is an exploded perspective view of the fiber optic plug of FIG. 3, including a plug body, a single-fiber ferrule, an alignment sleeve, a protective pulling cap, a crimp band and a coupling nut.

Referring to FIG. 7, the fiber optic plug 22 further includes a plug ferrule 70, an inner housing 72 with a crimp, an alignment sleeve 74, an outer housing 68 and a coupling nut 26. There may also be a plug boot (not shown) made of a flexible (silicone, rubber or other like) material secured over a portion of the outer housing 68 and a portion of the drop cable 24 in order to seal the exposed portion of the drop cable 24 while generally inhibiting kinking and providing bending strain relief to the cable 24 near the end of the plug 22. The strength components 78 of the cable 24 are terminated and a crimp band 80 is secured around the strength components 78. The crimp band 80 is preferably made from brass, but other suitable deformable materials may be used. The strength members (not shown) are cut flush with the stripped back jacket 76, thereby exposing the strength components 78 and optical component 82 adjacent the end of the drop cable 24. The crimp band 80 thereby provides strain relief for the cable 24. The inner housing 72 is assembled by first crimping the crimp band 80 onto the strength components of the cable 24. The outer housing 68 is then slid over the inner housing 72. The outer housing 68 is positioned onto the cable 24 before the inner housing 72.

The plug ferrule 70 is at least partially disposed within the inner housing 72 and extends lengthwise. The plug ferrule 70 may therefore be mounted within the inner housing 72 such that the front face of the plug ferrule 70 extends somewhat beyond the forward end of the inner housing 72. As with the corresponding fiber optic receptacle 20, the fiber optic plug 22 may include a variety of fiber optic connectors including SC, LC, MTRJ, MTP, SC-DC, and the like. The plug 22 of the exemplary embodiment is shown to include a single SC connector because a receptacle 20 can only receive a plug of like ferrule configuration. In this embodiment, the alignment sleeve 74 is positioned at least partially within the inner housing 72 and defines a lengthwise passageway for receiving the plug ferrule 70 and the opposing receptacle ferrule 46 when the plug 22 is mated with the receptacle 20.

The outer housing 68 has a generally cylindrical shape with a forward first end 84 and a rearward second end 86. The outer housing 68 generally protects the inner housing 72 and in preferred embodiments also aligns and keys engagement of the plug 22 with the mating receptacle 20. Moreover, the inner housing 68 includes a through passageway between the first and second ends 84 and 86. The passageway of the inner housing 72 includes a keying feature so that the inner housing 72 is inhibited from rotating once the plug 22 is assembled. The first end 84 of the outer housing 68 includes a key slot 88 (FIG. 7 and FIG. 9) for aligning the plug 22 with the receptacle 20, and consequently, the inner housing 72 relative to the receptacle 20. The plug 22 and the corresponding receptacle 20 are shaped to permit mating in only one orientation. In preferred embodiments, this orientation may be marked on the receptacle 20 and on the plug 22 using alignment indicia so that a less skilled field technician can readily mate the plug 22 with the receptacle 20. Any suitable indicia may be used. After alignment, the field technician engages the internal threads of the coupling nut 26 with the external threads of the receptacle 20 to secure the plug 22 to the receptacle 20.

Figure 8:
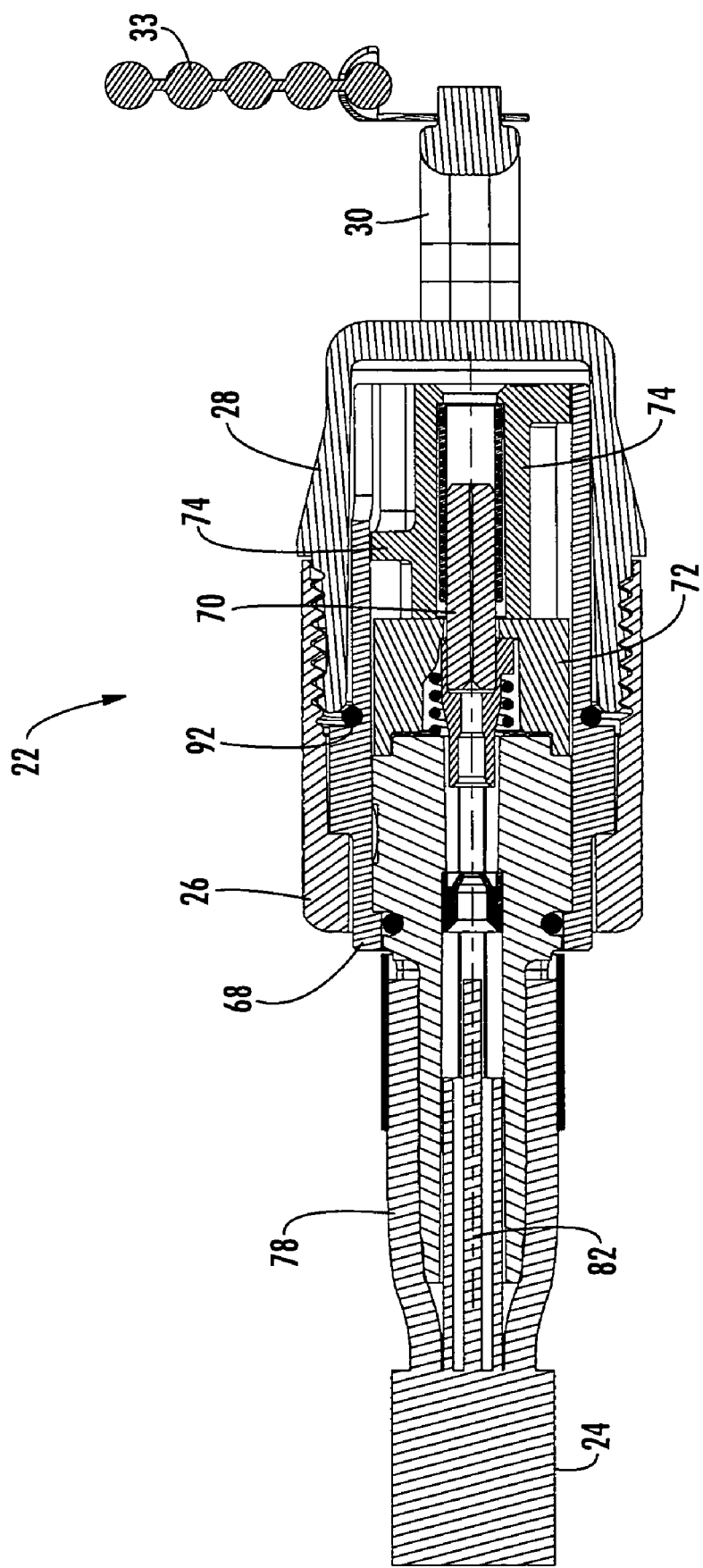
FIG. 8 is a cross-sectional view of the fiber optic plug of FIG. 7 taken along the line 8-8 and shown in an assembled configuration.

The outer housing 68 of the plug 22 may further define a shoulder 90 that provides a mechanical stop for both a conventional elastomeric O-ring 92 and the coupling nut 26. The O-ring 92 provides a weatherproof seal when the coupling nut 26 engages the threaded portion of the receptacle 20. The coupling nut 26 has a passageway sized so that it fits over the second end 86 of the outer housing 68 and easily rotates about the outer housing 68. In other words, the coupling nut 26 cannot move in the direction of the receptacle 20 beyond the shoulder 90, but is able to rotate with respect to the outer housing 68. FIG. 8 is a cross-section of the assembled plug 22 of FIG. 7 taken along line 8-8 with like parts indicated by like reference numbers.

Figure 9:
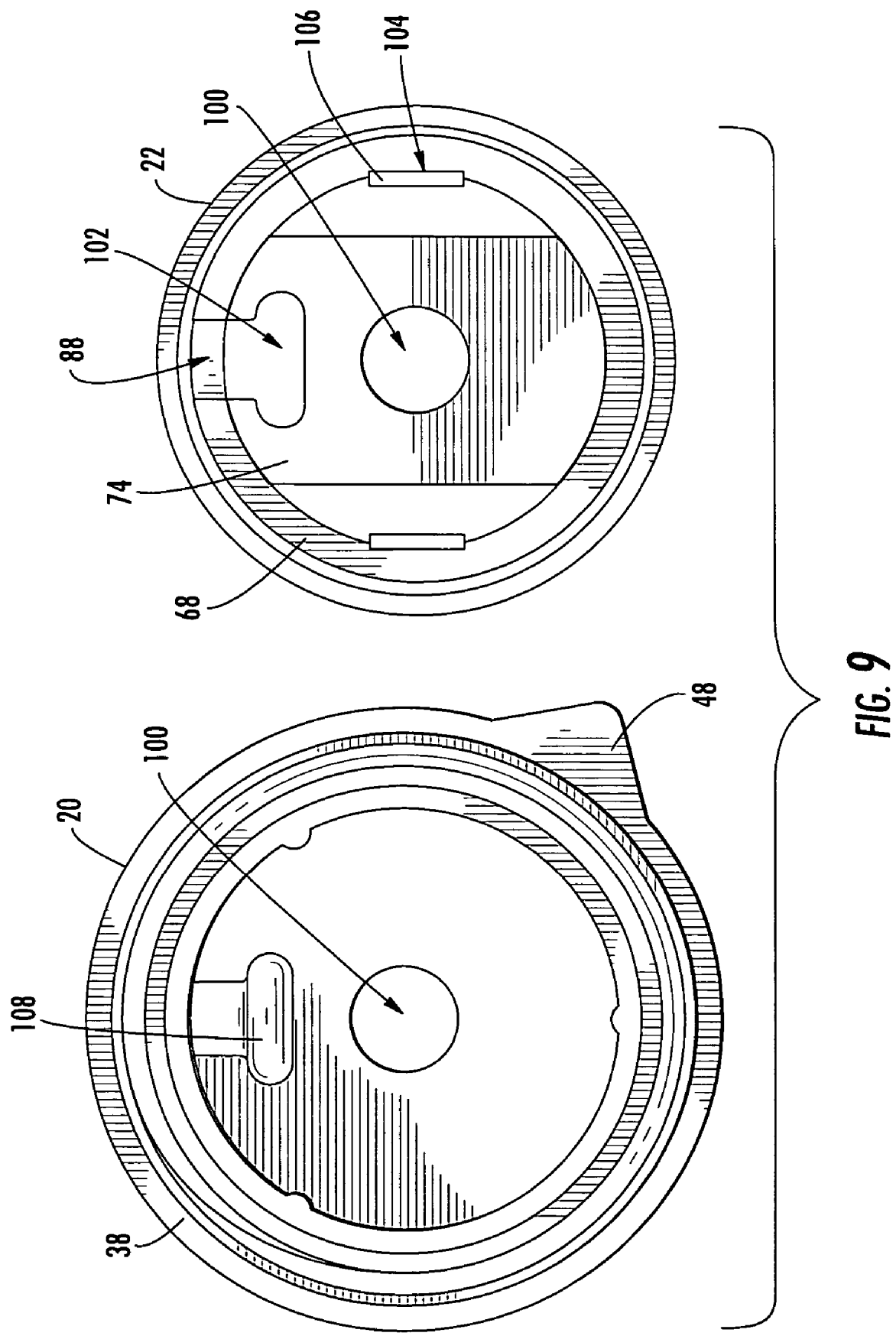
FIG. 9 is an end view of the receptacle and plug of FIG. 3 shown disengaged to better illustrate the alignment and keying features of the receptacle and plug assembly.

FIG. 9 is an end view of the receptacle 20 and plug 22 of FIG. 3 further illustrating the alignment and keying features of the assembly. As described above, the plug 22 engages the receptacle 20 to optically connect the optical fibers of the corresponding plug ferrule 70 and receptacle ferrule 46. The receptacle 20 and the alignment sleeve 74 define ferrule openings 100 corresponding to the number and type of mating ferrules. In the embodiment shown throughout FIGS. 3-9, one ferrule opening 100 is used to mate single-fiber SC ferrules, thus providing a "simplex" optical connector. The alignment sleeve 74 is retained and positioned within the outer housing 68 of the plug 22 such that the key slot 102 of the alignment sleeve 74 is aligned with the key slot 88 defined by the plug outer housing 68. In a preferred embodiment, the plug outer housing 68 defines a pair of openings 104 along its length adjacent first end 84 for receiving features 106 defined by the alignment sleeve 74. The features 106 are received by the openings 104 in order to properly align the alignment sleeve 74 within the plug outer housing 68, thus properly aligning the key slot 102 of the alignment sleeve 74 with the key slot 88 of the outer housing 68.

To perform an optical connection, the plug 22 is inserted into the receptacle 20. The receptacle 20 may only receive a plug 22 of like ferrule configuration. The receptacle 20 defines a key 108 that is received within the key slot 88 of the plug housing 68 and the key slot 102 of the alignment sleeve 74. As shown, the key 108 is a "T-shaped" structure, preferably molded into the receptacle 20. Receptacles having specific key shapes may be created for each type and/or number of ferrules. In an alternative embodiment, an insert having a specific key shape may be inserted into the receptacle housing 38 to accommodate a specific connector, thus allowing a generic receptacle housing to be used for different connector types. Upon connection, the key 108 accepts only a plug 22 of like ferrule configuration, while also properly aligning the plug 22 within the receptacle 20. Because the alignment and keying features extend to about the end of the plug 22, a plug 22 having a ferrule configuration different than the receptacle 20 may not be inserted into the receptacle 20, thereby eliminating potential damage to the ferrules. Alignment orientation is especially important in mating APC ferrules. The end face of an APC ferrule is disposed at a non-orthogonal angle, and generally at an angle of between about 6 and about 11 degrees relative to a plane normal to the longitudinal axis defined by the ferrule. Typically, the end face of an APC ferrule is disposed at about an 8-degree angle relative to the plane that extends normal to the longitudinal axis defined by the ferrule. In order to properly interconnect the optical fibers of a pair of opposing APC ferrules, the ferrules must be positioned such that the angled end faces are complimentary to one another, that is, the forwardmost portion of the end face of one ferrule is opposite the rearward most portion of the end face of the other ferrule. In order to facilitate the alignment of the ferrules in this complimentary fashion, the key 108 is disposed in a predetermined orientation relative to the end face of the ferrule.

Referring to FIG. 10, a dual-fiber version of a fiber optic receptacle 20 and plug 22 assembly is shown disengaged and with the protective dust cap 34 and pulling cap 28 of the receptacle and plug, respectively, removed. In this embodiment, the drop cable comprising two optical waveguides is not shown for purposes of clarity. The plug 22 is aligned with and engages only a receptacle 20 of like optical connector and ferrule configuration. The plug 22 shown allows a single receptacle 20 of a connection terminal to accommodate more than one optical fiber of the drop cable for optical connection with more than one optical fiber terminated from a distribution cable within the connection terminal. At the same time, the drop cable associated with the plug 22 is strain relieved at the connector port to withstand a drop cable-pulling force of up to about 600 lbs.

The receptacle 20 and the corresponding plug 22 are shown disengaged and with the respective dust cap 34 and pulling cap 28 removed. A threaded coupling nut 26 of the plug 22 is operable for securing the pulling cap 28 during shipping and deployment and for securing the plug 22 to the receptacle 20 following engagement when mating the plug 22 to the receptacle 20. A flexible boot 36 allows the assembly to be installed in a breathable enclosure and may become obsolete in the event that the receptacle 20 is otherwise reliably sealed within the connection terminal from adverse environmental conditions. As in the previous embodiment, the plug outer housing 68 has a generally cylindrical shape and includes alignment and keying features for mating the plug 22 with the receptacle 20. In particular, the outer housing 68 defines an alignment and keying feature on plug 22. As shown herein and previously described, the alignment and keying feature is in the form of a lengthwise key slot 94. The key slot 94 has a specific shape so that the plug 22 and receptacle 20 mate in only one orientation. In preferred embodiments, the orientation may be marked on both the outer housing 68 and the receptacle housing 38 so that a less skilled field technician can readily mate the plug 22 with the receptacle 20 by aligning an alignment indicia on the outer housing 68 with a complimentary alignment indicia disposed on the receptacle housing 38. Thereafter, the field technician engages the internal threads of the coupling nut 26 with the external threads on the receptacle housing 38 to secure the plug assembly 22 to the receptacle 20.

Referring to FIG. 11, the fiber optic plug 22 may be mounted upon any suitable fiber optic drop cable including more than one optical fiber since the optical connector shown includes more than one ferrule, such as a pair of LC ferrules. To secure the plug 22 to the receptacle 20, the coupling nut 26 engages the threaded end of the receptacle 20. The plug 22 may be secured in the field without special tools, equipment or training. Additionally, the physical connection may be easily connected or disconnected, thereby mating or un-mating the plug 22 with the receptacle 20, by engaging or disengaging the threads of the coupling nut 26 with the threads of the receptacle 20. Thus, the receptacle 20 and plug 22 assembly of the present invention allows the deployment of multiple optical fibers through a connector port provided in an external wall of a conventional network connection terminal in an easy, fast and economical manner.

Figure 12:
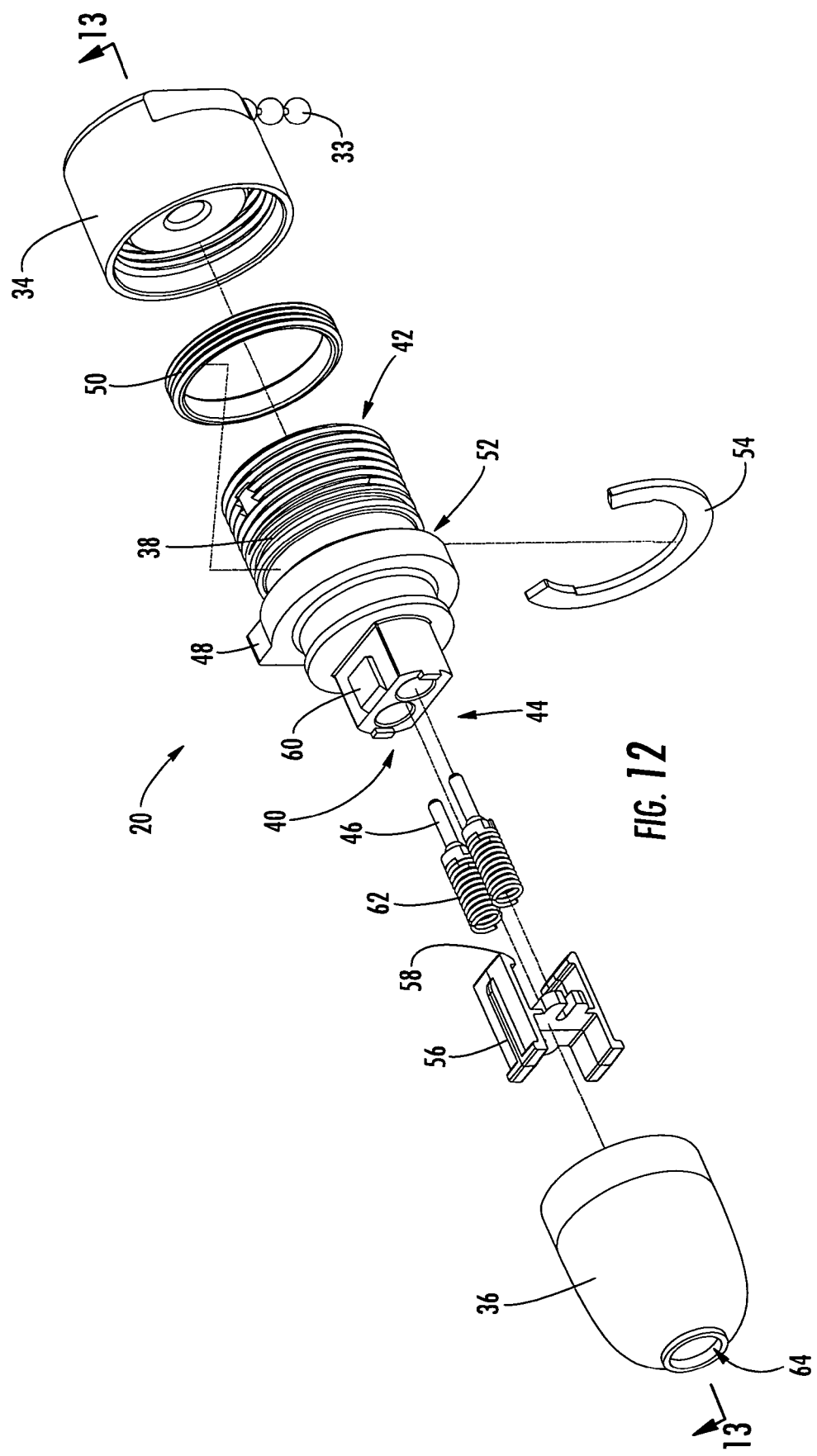
FIG. 12 is an exploded perspective view of the fiber optic receptacle of FIG. 10, including a receptacle body, a pair of single-fiber ferrules, a ferrule retainer, a protective end cap and a seal boot.

Referring to FIG. 12, as in the embodiment described above, the fiber optic receptacle 20 includes a receptacle housing 38 operable for mounting to the wall, while holding a ferrule and aligning the ferrule with the fiber optic plug 22 so that they can engage in only a preferred orientation. The receptacle housing 38 defines an interior cavity 40 opening through opposed ends, a first end 42 and a second end 44. The openings through the second end 44 are typically smaller and, in one advantageous embodiment, are sized to be only slightly larger than the receptacle ferrules 46, such that the receptacle ferrules 46 can be inserted through the opening. Although the fiber optic receptacle 20 may include a variety of fiber optic connectors including SC, LC, MTRJ, MTP, SC-DC, and the like, the receptacle 20 of the particular embodiment is shown to include a pair of LC connectors by way of example, and not of limitation. As in the previous embodiment, the alignment sleeve 74 is a component of the plug 22 and is inserted into the interior cavity 40 of the receptacle 20 upon insertion of the plug 22 through first end 42 of receptacle 20.

The receptacle housing 38 in the embodiment shown is cylindrically shaped and defines a shoulder portion 48 positioned medially between the first end 42 and the second end 44. Upon installation of the receptacle 20 within a connector port through an external wall of a connection terminal, the first end 42 of the receptacle housing 38 is inserted through the wall from the inside of the connection terminal until the surface of the shoulder portion 48 facing the first end 42 comes into contact with the inner surface of the wall. A seal may be provided between the receptacle housing 38 and the wall using an O-ring, multi-point seal 50 (as shown) or like sealing means. The receptacle 20 also includes a ferrule retainer 56 operable for retaining the receptacle ferrules 46 within the interior cavity 40 of the receptacle housing 38. The ferrule retainer 56 defines clips or hooks 58 that grip detent features 60 defined by the receptacle housing 38. The ferrule retainer 56 can be removed from the receptacle housing 38 to access the receptacle ferrules 46, such as for cleaning, repair, replacement or the like.

Figure 13:
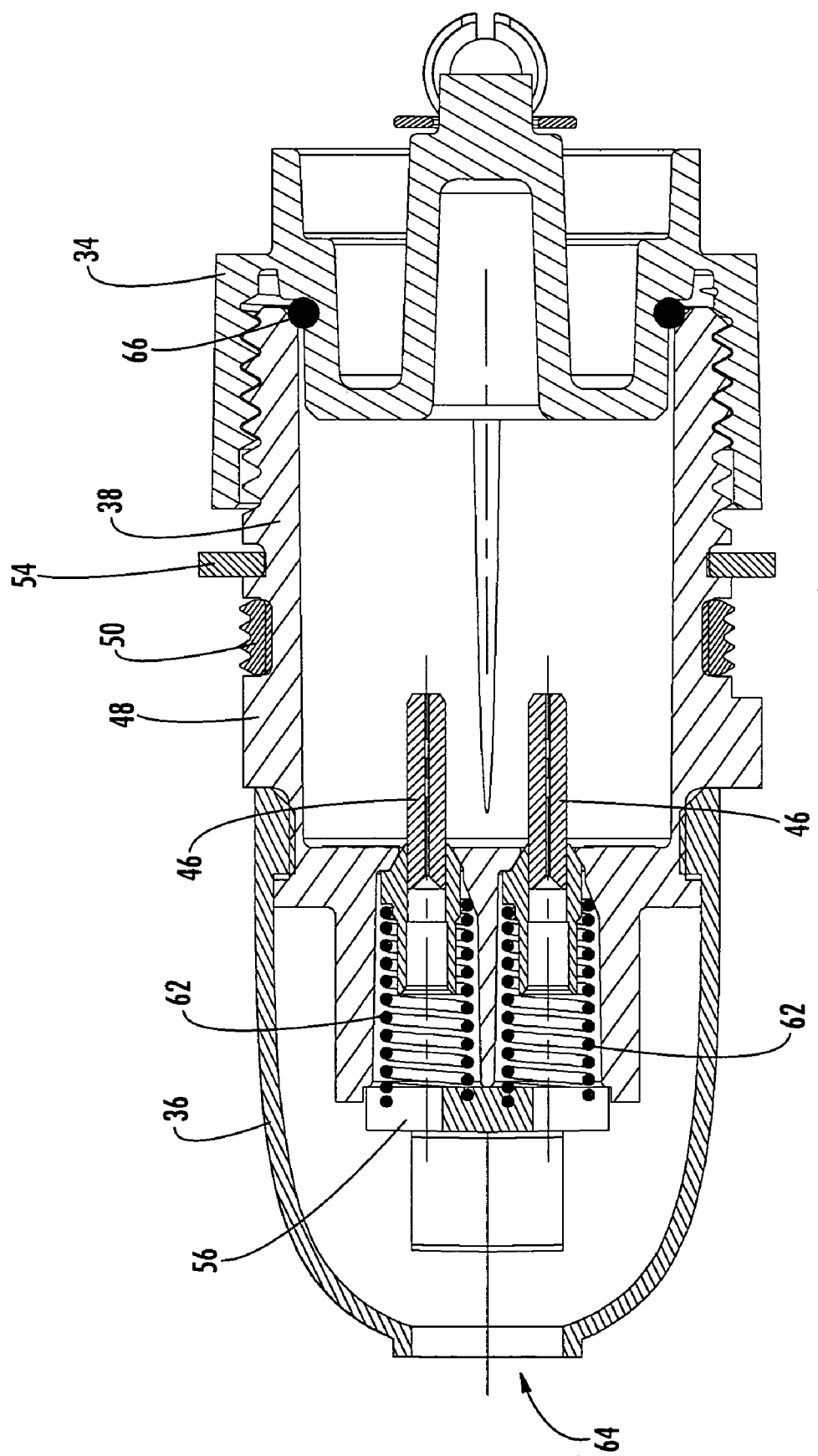
FIG. 13 is a cross-sectional view of the fiber optic receptacle of FIG. 12 taken along the line 13-13 and shown in an assembled configuration.

The fiber optic receptacle 20 of this exemplary embodiment also includes bias members disposed within the receptacle housing 38. The bias members operably engage the receptacle ferrules 46 and the ferrule retainer 56 to urge the receptacle ferrules 46 toward the first end 42 of the receptacle housing 38. As shown herein, the bias members consist of one or more linear coil springs 62. Thus, the receptacle ferrules 46 are spring-loaded and thereby allowed to float axially within the interior cavity 40, thus absorbing compressive forces between the receptacle ferrules 46 and the opposing plug ferrules 70. It should be understood, however, that the fiber optic receptacle 20 can include other types of bias members, in addition to or instead of one or more springs 62. The ferrule holder 56 may also include one or more posts (not shown) extending in a lengthwise direction such that a spring can be mounted upon each respective post. In such case, each spring 62 would be longer than its respective post, even in the compressed state. As such, the posts serve to position the springs 62 that, in turn, contact the receptacle ferrules 46. FIG. 13 is a cross-section of the assembled plug 22 of FIG. 12 taken along line 13-13 with like parts indicated by like reference numbers. An elastomeric O-ring seal 66 may be disposed between the dust cap 34 and the receptacle housing 38. The fiber optic receptacle 20 is adapted to receive a corresponding fiber optic plug 22 such that plug ferrules 70 of the fiber optic plug 22 are aligned with and inserted into the first end 42 of the receptacle housing 38.

Figure 14:
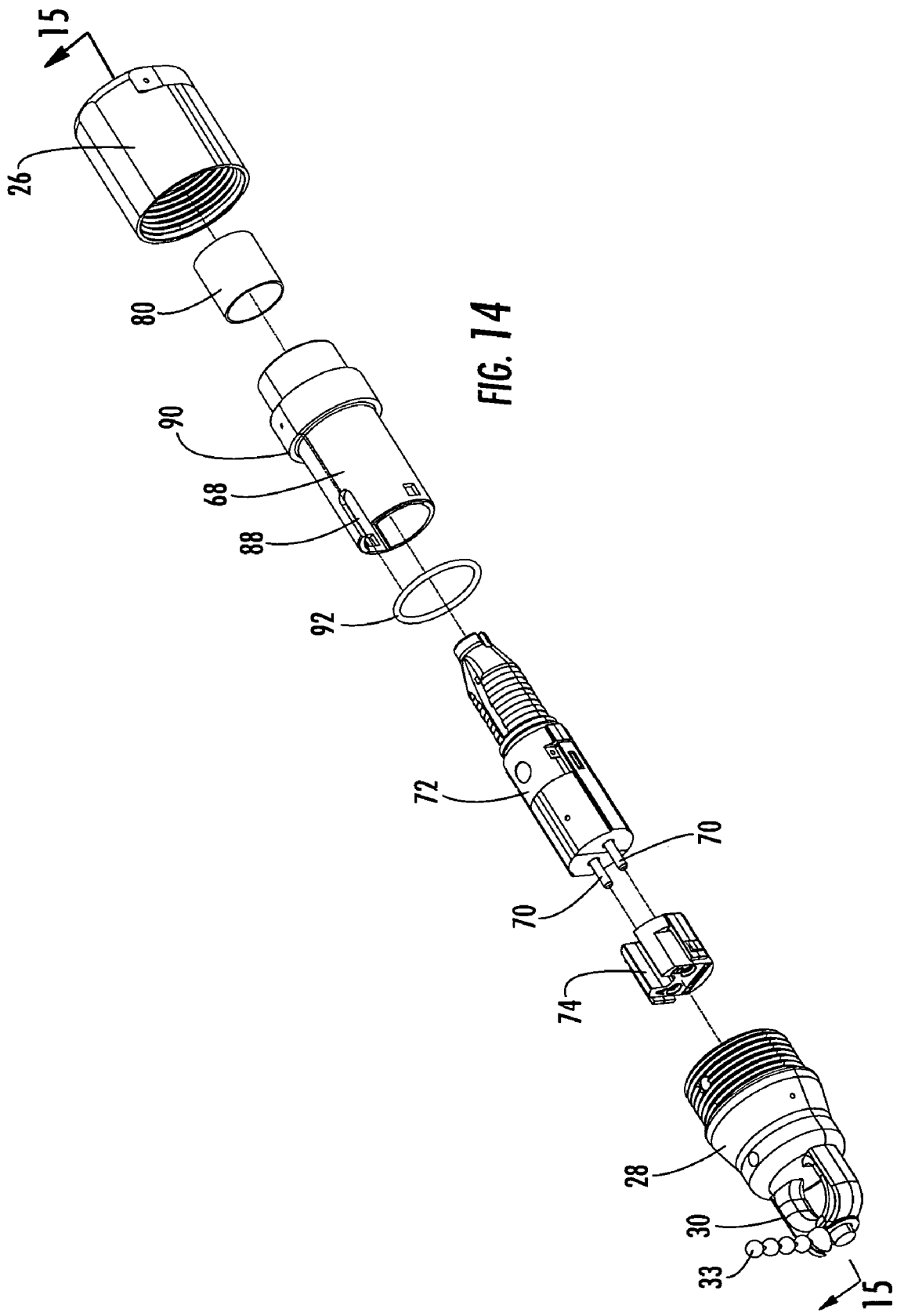
FIG. 14 is an exploded perspective view of the fiber optic plug of FIG. 10, including a plug body, a pair of single-fiber ferrules, an alignment sleeve, a protective pulling cap, a crimp band and a coupling nut.

Referring to FIG. 14, the corresponding plug 22 for the receptacle 20 shown in FIGS. 12-13 generally includes a plug inner housing 72, plug ferrules 70, an alignment sleeve 74, outer housing 68 and coupling nut 26. There may also be a plug boot (not shown) made of a flexible material (e.g., silicone, rubber or the like) secured over a portion of the outer housing 68 and a portion of the drop cable (not shown) to seal and provide bending strain relief to the cable near the plug 22. The crimp band 80 is secured around the strength components (not shown) of the cable and provides strain relief for the cable. The plug ferrules 70 are partially disposed within the inner housing 72 and extend lengthwise. To match the corresponding receptacle 20, the fiber optic plug 22 may include a variety of fiber optic connectors including SC, LC, MTRJ, MTP, SC-DC, and the like. The plug 22 of this exemplary embodiment is shown to include a pair of LC connectors which are smaller than SC connectors, thus allowing the diameter of the assembly to remain the same as the exemplary embodiment utilizing SC connectors previously described. The plug ferrules 70 are received within a lengthwise passageway defined by the alignment sleeve 74 for mating the plug ferrules 70 and the receptacle ferrules 46. The receptacle ferrules 46 are inserted into the open, forward end of the alignment sleeve 74. Thus, the alignment sleeve 74 serves to align the plug ferrules 70 positioned within the alignment sleeve 74 with the receptacle ferrules 46 received within the opposite end of the alignment sleeve 74 when the plug 22 is inserted into the receptacle 20. As such, the optical fibers upon which the respective ferrules are mounted are correspondingly aligned and optically interconnected.

The outer housing 68 generally protects the inner housing 72 and in preferred embodiments also aligns and keys mating of the plug 22 with the receptacle 20. Moreover, the inner housing 72 includes a through passageway that is keyed so that the inner housing 72 is inhibited from rotating when the plug 22 is assembled. The outer housing 68 includes a key slot 88 defined by the outer housing 68 for aligning the plug 22 with the receptacle 20. The plug 22 and the corresponding receptacle 20 are shaped to permit mating in only one orientation. After alignment, the field technician engages the internal threads of the coupling nut 26 with the external threads of the receptacle 20 to secure the plug 22 to the receptacle 20.

Figure 15:
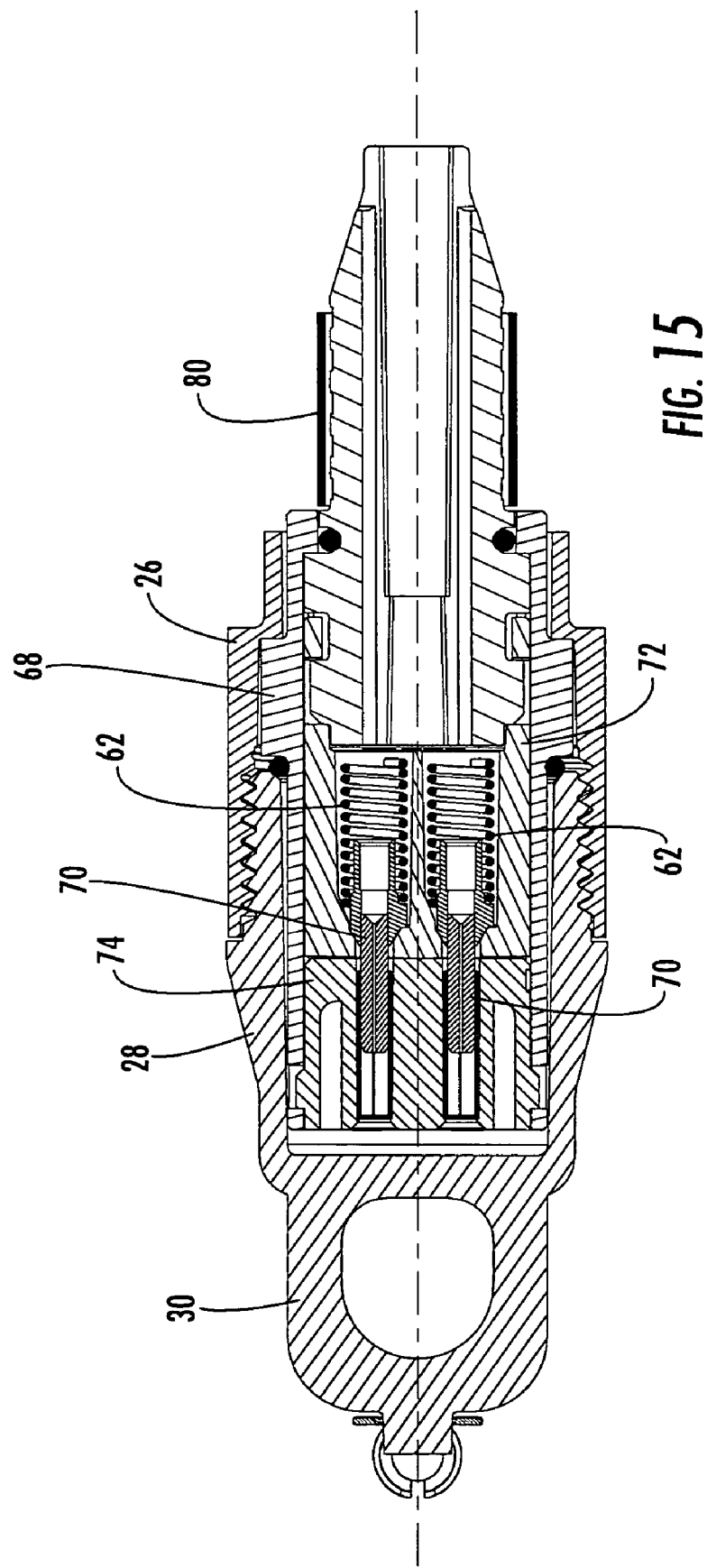
FIG. 15 is a cross-sectional view of the fiber optic plug of FIG. 14 taken along the line 15-15 and shown in an assembled configuration.

The outer housing 68 may further define a shoulder 90 that provides a mechanical stop for both an O-ring 92 and the coupling nut 26. The O-ring 92 provides a weatherproof seal between the plug 22 and the receptacle 20. The coupling nut 26 has a passageway sized so that it fits over the end of the outer housing 68 and easily rotates about the outer housing 68. FIG. 15 is a cross-section of the assembled plug 22 of FIG. 14 taken along line 15-15 with like parts indicated by like reference numbers.

Figure 16:
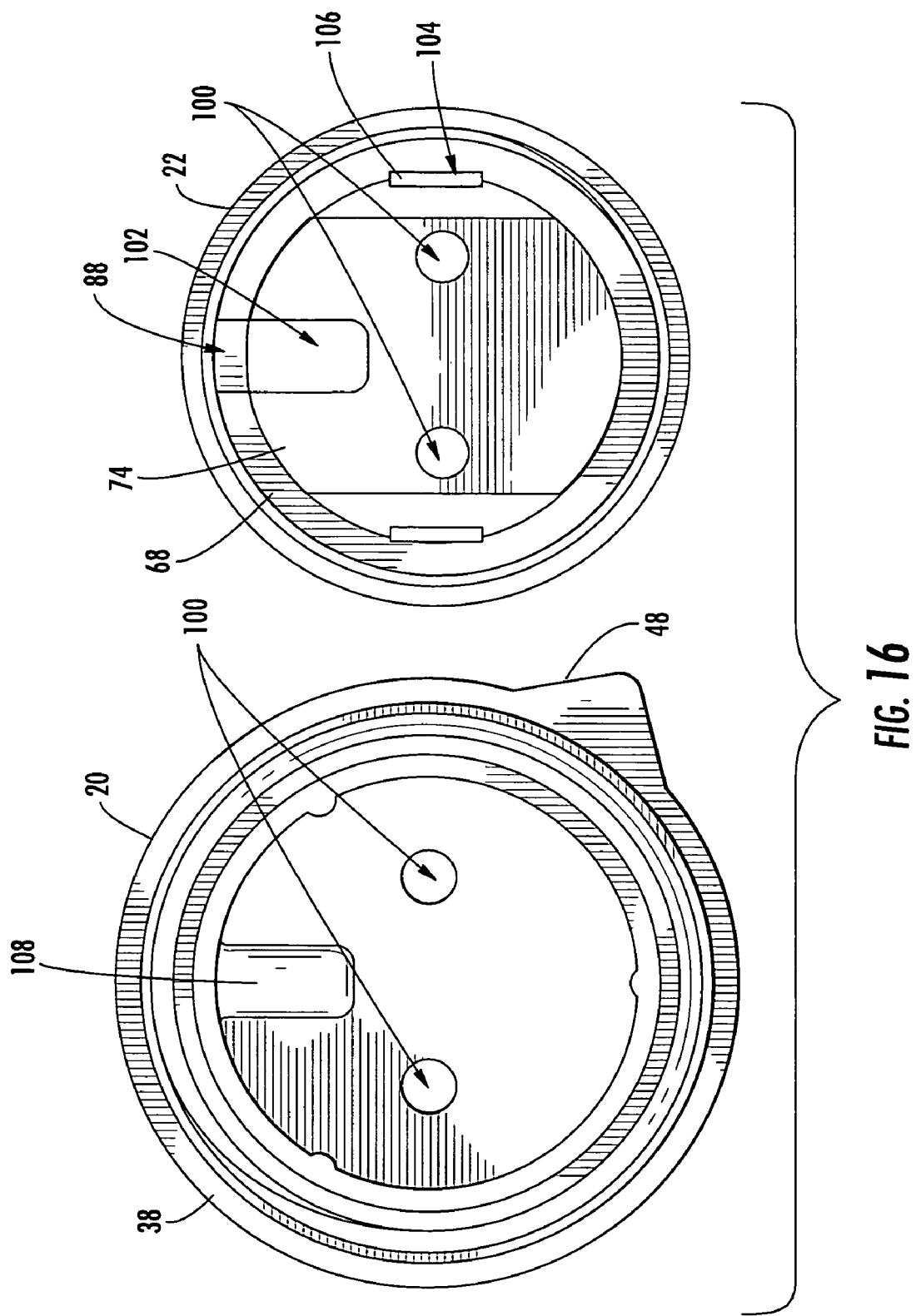
FIG. 16 is an end view of the receptacle and plug of FIG. 10 shown disengaged to better illustrate the alignment and keying features of the receptacle and plug assembly.

FIG. 16 is an end view of the receptacle 20 and plug 22 of FIG. 10 further illustrating the alignment and keying features of the assembly. The receptacle 20 and the alignment sleeve 74 define ferrule openings 100 corresponding to the number and type of receptacle ferrules 46 and plug ferrules 70, respectively. In the embodiment shown throughout FIGS. 10-15, pairs of ferrule openings 100 are used to mate the opposing pairs of LC receptacle ferrules 46 and LC plug ferrules 70, respectively, thus providing a "duplex" optical connector. The alignment sleeve 74 is retained and positioned within the outer housing 68 of the plug 22 such that the key slot 102 of the alignment sleeve 74 is aligned with the key slot 88 defined by the plug outer housing 68. In a preferred embodiment, the plug outer housing 68 defines a pair of openings 104 along its length for receiving detent features 106 defined by the alignment sleeve 74. The features 106 are received by the openings 104 in order to properly align the alignment sleeve 74 within the plug outer housing 68, thus properly aligning the key slot 102 of the alignment sleeve 74 with the key slot 88 of the outer housing 68. While the key slot 102 of the alignment sleeve 74 is preferably specific for each connector type, the key slot 88 of the outer housing 68 may be generic for all connector types, thus permitting the use of a common plug outer housing 68 for all connector types.

To perform an optical connection, the plug 22 is inserted into the receptacle 20. The receptacle 20 is configured to receive only a plug 22 of like ferrule configuration. The receptacle 20 defines a key 108 that is received within the key slot 88 of the plug housing 68 and the key slot 102 of the alignment sleeve 74. As shown, the key 108 is an "I-shaped" structure, preferably molded into the receptacle 20. Receptacles having specific keying shapes may be created for each type and/or number of ferrules. In an alternative embodiment, an insert having a specific key shape may be inserted into the receptacle housing 38 to accommodate a specific connector, thus allowing a generic receptacle housing to be used for different connector types. Upon connection, the key 108 accepts only a plug 22 of like ferrule configuration, while also properly aligning the plug 22 within the receptacle 20. Because the alignment and keying features extend to about the end of the plug 22, a plug 22 having a ferrule configuration different than the receptacle 20 may not be inserted into the receptacle 20, thereby eliminating potential damage to the receptacle ferrules 46 and the plug ferrules 70.

In alternative embodiments, the threads of the coupling nut 26 and the receptacle housing 38 may be replaced with a bayonet or push-pull style mechanism to secure the plug 22 within the receptacle 20. Alternatively, a spring clip or similar device may be added to engage the plug 22 and the receptacle 20 to secure them together. Sealing may be removed or relaxed based upon the extent of the adverse environmental conditions to which the assembly is exposed. The plug boot may be pre-manufactured and assembled onto the plug inner housing 72 and the drop cable 24, or may be overmolded using a technology available from Corning Cable Systems LLC of Hickory, N.C. Further, heat shrinkable tubing may be used to fulfill the same purpose as the boot when aesthetics are less important and bend characteristics less stringent. As previously demonstrated in the embodiment illustrated in FIGS. 1-2, the alignment sleeve 74 may be integrated into the receptacle 20 while maintaining the same assembly technique and allowing for easy removal and cleaning.

Designs for several types of ferrules (including multi-fiber) can be derived from the base design shown and described herein. Multi-fiber ferrule designs driven by the available space and requirements are possible, such as MTP, MTRJ, DC, multiple 1.25 mm, multiple 2.5 mm, etc. Additional strain relief may be added to the receptacle 20 if needed. Crimping solutions may differ depending on the drop cable type and requirements. If the drop cable does not include the dual GRP dielectric strength members as shown in the first embodiment, the methods of coupling the strength member to the plug body may include glue or other means of fastening, such as clamps.

The embodiments described above provide advantages over conventional fiber optic receptacle and plug assemblies. For example, the small size of the exemplary embodiments described herein allows for about a 38 mm diameter package for FTTx distribution cables and allows the receptacles to be mounted in connection terminals or other enclosures requiring very little penetration depth of the receptacle into the terminal or enclosure. The alignment and keying features of these assemblies makes them fully APC capable, and the unique fit prevents assembly errors during production and installation. An overmolded boot eliminates the need for heat shrinkable tubing and also improves the sealing integrity of the assembly under adverse environmental conditions in which a pre-formed boot may disengage from the plug 22.

The foregoing is a description of various embodiments of the invention that are given here by way of example only. Although fiber optic receptacle and plug assemblies have been described with reference to preferred embodiments and examples thereof, other embodiments and examples may perform similar functions or achieve similar results. All such equivalent embodiments and examples are within the spirit and scope of the present invention and are intended to be covered by the appended claims.

What is claimed is:

1. A fiber optic receptacle and plug assembly, comprising:
   a fiber optic receptacle having a first end and a second end opposite the first end and defining an interior cavity opening through the first end and the second end;
   an alignment sleeve insert disposed within the interior cavity adjacent the first end and comprising at least one alignment sleeve operable for receiving at least one receptacle ferrule from the second end;
   a fiber optic plug mounted upon an end of a fiber optic cable and comprising at least one plug ferrule;
   wherein the plug ferrule is received within the alignment sleeve opposite the receptacle ferrule when the plug is mated with the receptacle in a predetermined orientation; and
   wherein the receptacle defines a key, the alignment sleeve insert defines a first key slot, and the plug defines a second key slot, and wherein the key is configured to be received within the first key slot and the second key slot when the plug is mated with the receptacle.

2. The fiber optic receptacle and plug assembly of claim 1, wherein the plug further comprises a plug insert and the second key slot is disposed on the plug insert.

3. The fiber optic receptacle and plug assembly of claim 1, wherein the alignment sleeve insert comprises an alignment sleeve holder for receiving the alignment sleeve and wherein the key ensures that only a plug ferrule of like configuration is received within the alignment sleeve when the plug is mated with the receptacle.

4. The fiber optic receptacle and plug assembly of claim 1, wherein the fiber optic receptacle and the fiber optic plug are universal and operable to interconnect any type of optical connector comprising any configuration of opposing ferrules.

5. The fiber optic receptacle and plug assembly of claim 1, wherein the alignment sleeve insert and a corresponding plug insert disposed within the plug may be interchanged to accommodate a specific connector type having a predetermined configuration.

6. The fiber optic receptacle and plug assembly of claim 1, wherein the alignment sleeve insert is inserted into and removed from the interior cavity through the first end of the receptacle.

7. The fiber optic receptacle and plug assembly of claim 1, wherein the alignment sleeve insert is molded into the receptacle.

8. The fiber optic receptacle and plug assembly of claim 1, wherein the receptacle comprises a receptacle housing defining a first end, a second end, a shoulder portion disposed medially between the first end and the second end, and a threaded portion at least partially between the first end and the shoulder and wherein the plug comprises a threaded coupling nut for engaging the threaded portion of the receptacle to secure the shoulder against an inner surface of a wall of a connection terminal.

9. The fiber optic receptacle and plug assembly of claim 1, wherein the receptacle ferrule and the plug ferrule are each selected from the group consisting of SC, LC, MTRJ, MTP, SC-DC and APC ferrules.

10. A fiber optic receptacle and plug assembly, comprising:
- a fiber optic receptacle adapted to be mounted within an opening formed through a wall of a connection terminal, the receptacle comprising:
- a receptacle housing defining an interior cavity opening through opposed first and second ends, the receptacle housing comprising an alignment feature and a shoulder operable for securing the receptacle against an inner surface of the wall of the connection terminal; and
- an alignment sleeve insert defining a first complimentary alignment feature and comprising at least one alignment sleeve for receiving at least one receptacle ferrule; and
- a fiber optic plug adapted to be mated with the receptacle, the plug comprising;
- a plug housing defining a second complimentary alignment feature; and
- at least one plug ferrule received within the alignment sleeve opposite the receptacle ferrule when the plug is mated with the receptacle;
- wherein the alignment feature, the first complimentary alignment feature and the second complimentary alignment feature ensure that the plug ferrule and the receptacle ferrule are positioned in a predetermined orientation when the plug is mated to a receptacle of like ferrule configuration; and
- wherein the alignment feature is a key and wherein the first complimentary alignment feature and the second complimentary alignment feature are key slots configured for receiving the key such that the receptacle ferrule and the plug ferrule are received within the alignment sleeve in a predetermined orientation.

11. The fiber optic receptacle and plug assembly of claim 10, wherein the alignment feature is also a keying feature that prevents the alignment sleeve of the receptacle from receiving a plug ferrule having a configuration that is unlike the configuration of the receptacle ferrule.

12. The fiber optic receptacle and plug assembly of claim 10, wherein the alignment sleeve insert and a corresponding plug insert disposed within the plug may be interchanged to accommodate a specific connector type having a predetermined configuration.

13. The fiber optic receptacle and plug assembly of claim 10, wherein the alignment sleeve insert is inserted into and removed from the interior cavity through the first end of the receptacle housing.

14. The fiber optic receptacle and plug assembly of claim 10, wherein the alignment sleeve insert is molded into the receptacle.

15. The fiber optic receptacle and plug assembly of claim 10, wherein the receptacle housing defines a shoulder portion disposed medially between the first end and the second end, and a threaded portion at least partially between the first end and the shoulder and wherein the plug comprises a threaded coupling nut for engaging the threaded portion of the receptacle to secure the shoulder against an inner surface of a wall of a connection terminal.

16. The fiber optic receptacle and plug assembly of claim 10, wherein the receptacle ferrule and the plug ferrule are each selected from the group consisting of SC, LC, MTRJ, MTP, SC-DC and APC ferrules.

17. An optical connector comprising:
- a fiber optic receptacle having a first end and a second opposite the first, the receptacle defining an interior cavity opening through the first end and the second end, the receptacle comprising an alignment feature disposed within the interior cavity and an alignment sleeve insert adjacent the first end including at least one alignment sleeve for receiving at least one receptacle ferrule inserted through the second end, the alignment sleeve defining a first complimentary alignment feature for engaging the alignment feature to ensure that the alignment sleeve insert is positioned at a predetermined orientation relative to the receptacle;
- a fiber optic plug having at least one plug ferrule that is received within the alignment sleeve when the plug is mated with the receptacle, the plug defining a second complimentary alignment feature for engaging the alignment feature to ensure that the plug is positioned at a predetermined orientation relative to the receptacle.

18. The optical connector of claim 17, wherein the alignment feature is a key and the first complimentary alignment feature and the second complimentary alignment feature are key slots for receiving the key and wherein the plug ferrule is positioned at a predetermined orientation relative to the receptacle ferrule when the plug is mated with the receptacle.

* * * * *